United States Patent
Ohara

(10) Patent No.: US 8,368,914 B2
(45) Date of Patent: Feb. 5, 2013

(54) SYSTEM, DEVICE AND SERVER FOR RESTARTING A SERVICE STOPPED BY OCCURRENCE OF AN ERROR

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1366 days.

(21) Appl. No.: 11/341,648

(22) Filed: Jan. 30, 2006

(65) Prior Publication Data

US 2006/0173998 A1    Aug. 3, 2006

(30) Foreign Application Priority Data

Jan. 31, 2005    (JP) ................. 2005-023947

(51) Int. Cl.
*G06F 3/12* (2006.01)
(52) U.S. Cl. ....................................... 358/1.15
(58) Field of Classification Search .......... 358/1.1, 358/1.15
See application file for complete search history.

(56) References Cited

U.S. PATENT DOCUMENTS

| 6,922,725 | B2 | 7/2005 | Lamming et al. |
| 7,400,421 | B2 | 7/2008 | Endo et al. |
| 2004/0177337 | A1 | 9/2004 | Iida et al. |
| 2004/0186801 | A1 * | 9/2004 | Morita ............................. 705/32 |

FOREIGN PATENT DOCUMENTS

| JP | 6133141 | 5/1994 |
| JP | H07-288625 A | 10/1995 |
| JP | 2002-196917 A | 7/2002 |
| JP | 2003-196076 A | 7/2003 |
| JP | 2004-220098 A | 8/2004 |
| JP | 2004274150 | 9/2004 |
| JP | 2004-320716 A | 11/2004 |

OTHER PUBLICATIONS

Japan Patent Office, Notification of Reasons of Rejection mailed Nov. 11, 2008, in priority Patent Application No. JP 2005-023947.

* cited by examiner

*Primary Examiner* — Benny Q Tieu
*Assistant Examiner* — Jeremiah Bryar
(74) *Attorney, Agent, or Firm* — Baker Botts L.L.P.

(57) ABSTRACT

A service providing system including a client device and a server is provided. The client device includes a function execution unit that executes one of the functions of the image reading and printing units in accordance with an execution command from the server, an error notification unit that notifies the server of occurrence of an error, a manner designation unit that requests a user to designate a manner of restarting, and a manner notification unit that sends a notification containing the manner of restarting to the server. The function execution unit restarts the execution of the function interfered by the error in accordance with a command requesting a restart of the function received from the server which has been notified of the manner of restarting. The server includes a service providing unit that sends the execution command, a phase identifying unit that identifies a phase in which the error interfering with the execution of the function arises, and a designation instruction unit that transmits the command requesting the designation of the manner of restarting. The service providing unit operates to send the command requesting restart to the client device to restart the execution of the service according to the manner of restarting notified by the client device when the server is notified of the manner of restarting from the client device that has received the command from the designation instruction unit.

10 Claims, 17 Drawing Sheets

| SESSION ID | SERVICE NAME | TIME |
|---|---|---|
| SS1 | TRANSLATION COPY: JAPANESE→ENGLISH | 2004/11/19 10:11 |
| SS2 | TRANSLATION COPY: JAPANESE→ENGLISH | 2004/11/20 13:22 |
| SS3 | TRANSLATION COPY: ENGLISH→JAPANESE | 2004/11/21 20:03 |
| ... | ... | ... |

FIG. 9

| SESSION ID | USER ID REPRESENTING USER | FILE | PHASE INFORMATION | MANNER OF TRANSLATION |
|---|---|---|---|---|
| SS1 | user1 | f1 | Translation Scan, Page 2 | Japanese → English |
| SS2 | user2 | f2 | Translation Print, Page 3 | English → Japanese |
| SS3 | user3 | f3 | Translation Scan, Completed | Japanese → English |

FIG.16

SYSTEM, DEVICE AND SERVER FOR RESTARTING A SERVICE STOPPED BY OCCURRENCE OF AN ERROR

CROSS-REFERENCE TO RELATED APPLICATION

This application claims priority under 35 U.S.C. §119 from Japanese Patent Application No. 2005-023947, filed on Jan. 31, 2005. The entire subject matter of the application is incorporated herein by reference.

BACKGROUND

1. Technical Field

Aspects of the present invention relate to a service providing system in which services concerning functions of a client device are provided from a server to the client device.

2. Description of Related Art

A service providing system, in which a client device operates to generate image data (e.g., image data obtained by reading originals on a client device) and to send it to a server, the server operates to process the image data received from the client device and to send the processed image data to the client device, and the client device further operates to print images of the processed image data, has been proposed. By using the service providing system, a user is able to obtain an image which a client device of the user is not able to generate.

In such a system, the server is not able to detect the occurrence of an error which may arise in generating image data on the client device or in printing out images of image data on a client device. Therefore, if an error arises on the client device, it becomes impossible to properly provide the service from the server to the client device.

Japanese Patent Provisional Publication No. 2004-274150 (hereafter, referred to as JP 2004-274150A) discloses a service providing system in which if an error arises after image data is sent from a client device to a server and before printing of image data processed by the server is finished, the client device requests the server to resend the processed image data. The system disclosed in JP 2004-274150A enables a user to receive service even if an error arises on the client device.

However, the system disclosed in JP 2004-274150A has a drawback that the user is not able to restart the service, which is stopped by the occurrence of the error, in a desirable manner because according to JP 2004-274150A, the service stopped by the occurrence of the error is executed from the start.

SUMMARY

Aspects of the present invention are advantageous in that a service providing system capable of restarting a service, which is stopped by the occurrence of an error, in a manner desired by a user, is provided.

BRIEF DESCRIPTION OF THE ACCOMPANYING DRAWINGS

FIG. 9 shows an example of a data structure of unsolved session management information.

FIG. 16 shows an example of a data structure of session management information.

DETAILED DESCRIPTION

General Overview

Figure 1:
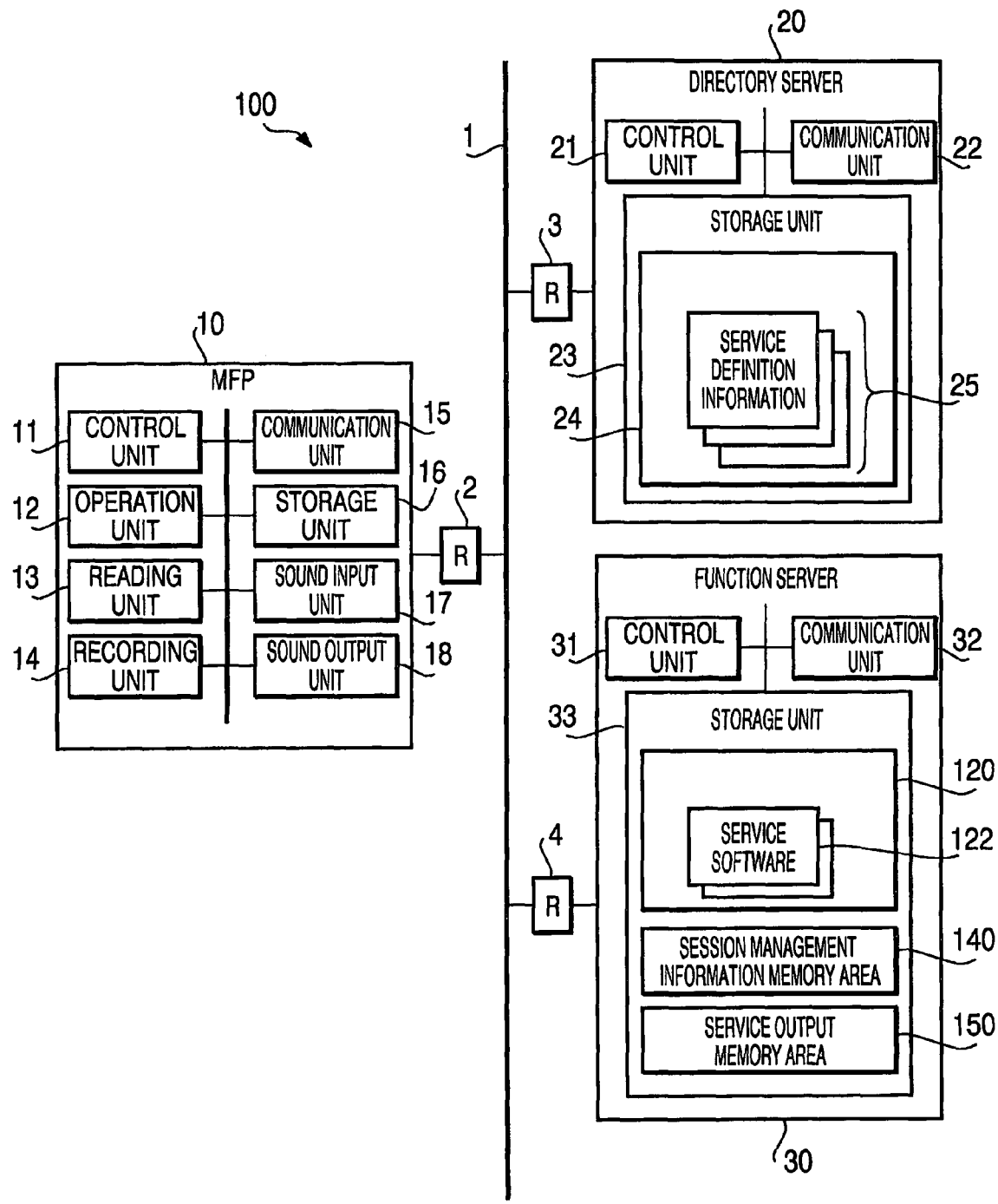
FIG. 1 is a block diagram of a service providing system according to an embodiment.

According to an aspect of the invention, there is provided a service providing system, which includes a client device including at least one of an image reading unit which reads an image and generates image data representing the image and an image printing unit which prints an image represented by the image data, and a server configured to execute a service regarding at least one of functions of the image reading unit and the image printing unit. In the system, the client device includes a function execution unit that controls one of the image reading unit and the image printing unit to execute one of the functions of the image reading unit and the image printing unit in accordance with an execution command requesting execution of a function received from the server, an error notification unit that notifies the server of occurrence of an error if an error interfering with execution of a function controlled by the function execution unit arises before the execution of the function is finished, a manner designation unit that requests a user to designate a manner of restarting indicating how to restart execution of a function, which is interfered by the error and is to be controlled by the function execution unit, if a command requesting designation of the manner of restarting is received from the server which has notified of the occurrence of an error, and a manner notification unit that sends a notification containing the manner of restarting designated by the user to the server. The function execution unit restarts the execution of the function interfered by the error in accordance with a command requesting a restart of the function received from the server which has been notified of the manner of restarting.

Further, the server includes a service providing unit that sends the execution command as one of operations for providing a service for the client device, a phase identifying unit that identifies a phase in which the error interfering with the execution of the function arises, from among phases existing throughout the execution of the function, based on information contained a notification received from the error notification unit during the execution of the function, and a designation instruction unit that transmits the command requesting the designation of the manner of restarting so that the manner of restarting is designated from among more than one manner of restarting including a manner for restarting the execution of the function from the phase identified by the phase identifying unit. The service providing unit operates to send the command requesting restart to the client device to restart the execution of the service according to the manner of restarting notified by the client device when the server is notified of the manner of restarting from the client device that has received the command from the designation instruction unit.

With this configuration, the user is able to determine a manner of receiving a service in the case where the service is stopped by an error. That is, the service which is stopped by the occurrence of an error is restarted in a manner desired by the user.

Optionally, the function execution unit of the client device may be configured to cause the image reading unit to generate image data to be obtained by reading images formed on a recording medium set at a predetermined reading position and to transmit the image data to the server, when the client device receives a request for the image data to be obtained by reading images formed on the recording medium as the execution command. The error notification unit of the client device may configured to notify the server of the occurrence of an error if one of a reading error and a transmission error arises before transmission of the image data by the function execution unit is finished. The service providing unit of the server may execute a command process for sending the request for the image data to be obtained by reading images formed on the recording medium to the client device, and for receiving the image data from the client device which has received the request. The phase identifying unit of the server may identify a phase following a phase in which images represented by the received image data have been successfully read, using the image data successfully received from the client device which has received the request of the command process, as the phase in which the error interfering with the execution of the function arises, if the command process is not finished at a time when the occurrence of the error is notified. If the manner of restarting notified from the client device which has received the command from the designation instruction unit indicates that the execution of the function is to be restarted from the identified phase and if the identified phase is preceding completion of reception of all of the image data requested from the client device in the command process, the service providing unit may execute a restart command process for sending an instruction requesting the client device to restart the reading of images from the identified phase and for receiving image data from the client device which has received the instruction.

With this configuration, the user is able to receive the service, which is stopped by an error, from the phase following the phase in which images have been successfully read.

Still optionally, the error notification unit of the client device may send reading status information enabling the server to identify image data for which the reading of images has been successfully finished before a time when the notification of the error is received, if one of the reading error and the transmission error arises before transmission of the image data by the function execution unit is finished.

With this configuration, the server is able to identify the phase from which the service should be restarted, from the reading status information.

Still optionally, the function execution unit of the client device may be configured to cause the image printing unit to print one or more images represented by image data from the server on recording medium, if the client device receives the image data and a request for printing images represented by the image data on recording medium from the server as the execution command. The error notification unit of the client device may be configured to notify the server of the occurrence of an error, together with print status information enabling the server to identify an image for which the printing of images has been successfully finished before a time when the error arises, if one of a reception error of the image data and a print error of the images arises before printing for all of the image data by the function execution unit is finished. The service providing unit of the server may execute a command process for sending the image data to the client device, and for sending the request for printing one or more images represented by the image data on recording medium to the client device. The phase identifying unit of the server identifies a phase following a phase in which the printing of the image identified from the print status information is finished, as the phase to be identified, if the occurrence of the error is notified from the client device together with the print status information. If the manner of restarting notified from the client device which has received the command from the designation instruction unit indicates that the execution of the function is to be restarted from the identified phase and if the identified phase is preceding completion of the printing of all of the images represented by the image data requested from the client device in the command process, the service providing unit may request transmission of at least a part of image data blocks required for restarting the printing of the images from the identified phase and the printing of one or more images represented by the part of the image data blocks, from the client device.

With this configuration, the user is able to receive the service, which is stopped by an error, from the phase following the phase in which images have been successfully printed.

Still optionally, the client device may include a restart request unit that requests a restart of the execution of the function interfered by the error from the server, according to a user operation, after the occurrence of the error is notified to the server. The manner designation unit may request the user to designate the manner of restarting, according to a command from the server which has received the request from the restart request unit. The server may include a phase registration unit that registers the identified phase in association with the client device. When the server receives the request for restart of the execution of the function from the client device, the designation instruction unit of the server may locate the identified phase corresponding to the client device from among phases registered by the phase registration unit, and transmits the command requesting the designation of the manner of restarting so that the manner of restarting is designated from among more than one manner of restarting including a manner for restarting the execution of the function from the identified phase corresponding to the client device.

With this configuration, the user is able to restart the service, which is stopped by the occurrence of the error, at a desirable time.

According to another aspect of the invention, there is provided a client device including at least one of an image reading unit which reads an image and generates image data representing the image and an image printing unit which prints an image represented by image data. The client device is connected to a server for receiving services concerning at least one of functions of the image reading unit and the image printing unit from the server. The client device includes a function execution unit that controls one of the image reading unit and the image printing unit to execute one of the functions of the image reading unit and the image printing unit in accordance with an execution command requesting execution of a function received from the server, an error notification unit that notifies the server of occurrence of an error if an error interfering with execution of a function controlled by the function execution unit arises before the execution of the function is finished, a manner designation unit that requests a user to designate a manner of restarting indicating how to restart execution of a function, which is interfered by the error and is to be controlled by the function execution unit, if a command requesting designation of the manner of restarting is received from the server which has notified of the occurrence of an error, and a manner notification unit that sends a notification containing the manner of restarting designated by the user to the server. In this configuration, the function execution unit restarts the execution of the function interfered by the error in accordance with a command requesting a restart of the function received from the server which has been notified of the manner of restarting.

With this configuration, the user is able to determine a manner of receiving a service in the case where the service is stopped by an error. That is, the service, which is stopped by the occurrence of an error, is restarted in a manner desired by the user.

According to another aspect of the invention, there is provided a server for providing a service for a client device including at least one of an image reading unit which reads an image and generates image data representing the image and an image printing unit which prints an image represented by the image data. The service concerns one of functions of the image reading unit and the image printing unit. The server includes a service providing unit that sends an execution command as one of operations for providing a service for the client device, a phase identifying unit that identifies a phase in which the error interfering with the execution of the function arises, from among phases existing throughout the execution of the function, based on information contained a notification received from the error notification unit during the execution of the function, and a designation instruction unit that transmits the command requesting the designation of the manner of restarting so that the manner of restarting is designated from among more than one manner of restarting including a manner for restarting the execution of the function from the phase identified by the phase identifying unit. In this configuration, the service providing unit operates to send the command requesting restart to the client device to restart the execution of the service according to the manner of restarting notified by the client device when the server is notified of the manner of restarting from the client device that has received the command from the designation instruction unit.

With this configuration, the user is able to determine a manner of receiving a service in the case where the service is stopped by an error. That is, the service, which is stopped by the occurrence of an error, is restarted in a manner desired by the user.

According to another aspect of the invention, there is provided a method for receiving services form a server. The method is implemented on a client device having an image reading unit which reads an image and generates image data representing the image and an image printing unit which prints an image represented by image data. The method includes the steps of executing one of functions of the image reading unit and the image printing unit in accordance with an execution command requesting execution of a function received from the server, notifying the server of occurrence of an error if an error interfering with execution of a function executed by the executing step arises before execution of the function is finished, requesting a user to designate a manner of restarting indicating how to restart execution of the function, which is interfered by the error, if a command requesting designation of a manner of restarting is received from the server which has notified of the occurrence of the error, and sending a notification containing the manner of restarting designated by the user to the server. In the executing step, the execution of the function interfered by the error is restarted in accordance with a command requesting a restart of the function received from the server which has been notified of the manner of restarting.

With this configuration, the user is able to determine a manner of receiving a service in the case where the service is stopped by an error. That is, the service, which is stopped by the occurrence of an error, is restarted in a manner desired by the user.

According to another aspect of the invention, there is provided a method for providing services. The method is implemented on a server to provide services for a client device having an image reading unit which reads an image and generates image data representing the image and an image printing unit which prints an image represented by image data. The method includes the steps of sending an execution command as one of operations for providing a service for the client device, identifying a phase in which an error interfering with execution of a function executed by the client device arises, from among phases existing throughout the execution of the function, based on information contained a notification received from the client device during the execution of the function, and transmitting a command requesting a designation of a manner of restarting so that the manner of restarting is designated from among more than one manner of restarting including a manner for restarting the execution of the function from the phase identified by the identifying step. In the sending step, a command requesting restart is sent to the client device to restart the execution of the service according to the manner of restarting notified by the client device when the server is notified of the manner of restarting from the client device that has received the command requesting the designation of a manner restarting.

With this configuration, the user is able to determine a manner of receiving a service in the case where the service is stopped by an error. That is, the service, which is stopped by the occurrence of an error, is restarted in a manner desired by the user.

Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

Illustrative Embodiments

Hereafter, an illustrative embodiment according to the invention will be described with reference to the accompanying drawings.

FIG. 1 is a block diagram of a service providing system 100 according to an embodiment of the invention. As shown in FIG. 1, the service providing system 100 includes a MFP (multifunction peripheral) 10, a directory server 20 and a function server 30, which are connected to a network 1 via respective routers 2, 3 and 4. The network 1 is, for example, a WAN (wide area network).

The MFP 10 includes a control unit 11, an operation unit 12, a reading unit 13, a recording unit 14, a communication unit 15, a storage unit 16, a sound input unit 17 and a sound output unit 18. The control unit 11 includes a CPU, a ROM and a RAM (not shown in FIG. 1), and the CPU executes programs stored in the ROM so as to control operations of the MFP 10.

Figure 2:
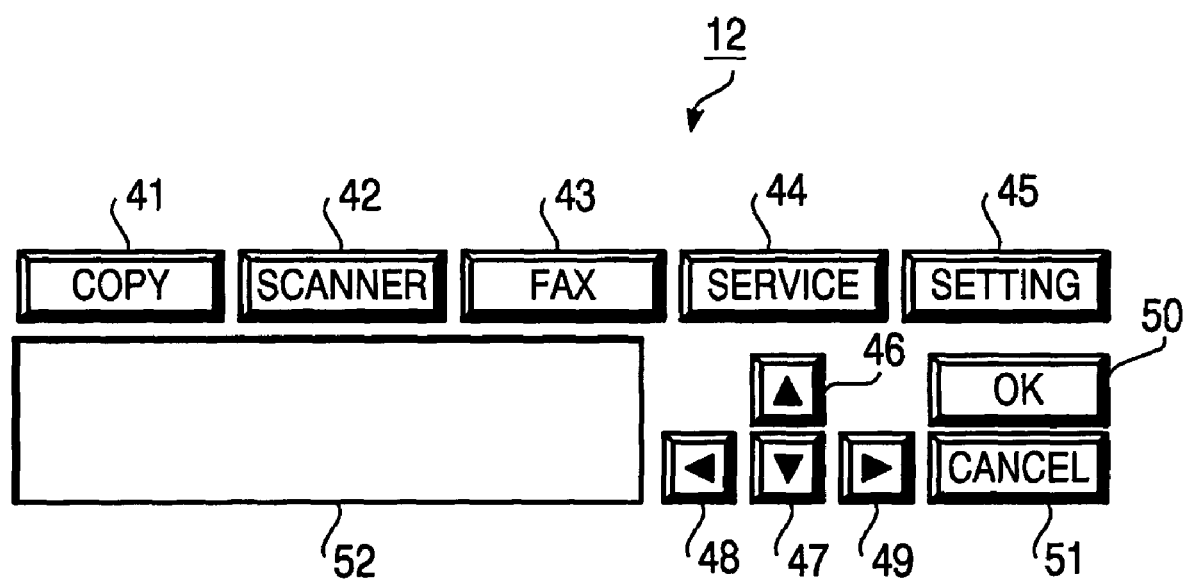
FIG. 2 shows an operation unit of an MFP provided in the service providing system.

As shown in FIG. 2, the operation unit 12 functioning as a user interface of the MFP 10 includes a copy key 41, a scanner key 42, a FAX key 43, a service key 44, a setting key 45, cursor keys 46 (up, down, left and right keys), an OK key 50, and a cancel key 51. The operation unit 12 further includes a display 52.

The reading unit 13 functioning as a scanner reads an image formed on (printed on) an original and generates image data corresponding to the read image. The recording unit 14 functioning as a printer forms an image on a sheet in accordance with image data. The communication unit 15 conducts data processing for the data communication with a node (e.g., the directory server 20 or the function server 30) on the network 1.

The storage unit 16 includes a non-volatile RAM in which various types of data is stored. The sound input unit 17 includes a microphone installed in a handset (not shown) of the MFP 10. The sound input unit 17 generates sound data (e.g. PCM data) representing the sound obtained by the microphone. The sound output unit 18 outputs sound via a speaker installed in the handset or a speaker installed in a main body of the MFP 10.

The directory server 20 includes a control unit 21, a communication unit 22 and a storage unit 23. The control unit 21 includes a CPU, a ROM and a RAM (not shown in FIG. 1), and the CPU executes programs stored in the ROM so as to control operations of the directory server 20. The communication unit 22 conducts data processing for the data communication with a node (e.g., the MFP 10) on the network 1. The storage unit 23 includes a hard disk drive (not shown in FIG. 1) in which varies types of data are stored. In the storage unit 23, a service definition information memory area 24 for storing service definition information 25 is provided.

The service definition information 25 is XML data described by an XML (eXtensible Markup Language). It is possible to display a service list including services that the function server 30 supports on a service selection screen which can be generated by use of the service definition information 25. For example, the service list includes service types and destination addresses (URL; Uniform Resource Locator) of services.

The function server 30 includes a control unit 31, a communication unit 32, and a storage unit 33. The control unit 31 includes a CPU, a ROM and a RAM (not shown in FIG. 1), and the CPU executes programs stored in the ROM so as to control operations of the function server 30. It should be noted that the control unit 31 of the function server 30 has considerably higher performance than that of the control unit 11 of the MFP 10, and therefore is able to execute processes that the MFP 10 is not able to execute.

The communication unit 32 conducts data processing for the data communication with a node (e.g., the MFP 10) on the network 1. The storage unit 33 includes a hard disk drive (not shown in FIG. 1) in which various types of data are stored. The storage unit 33 includes a service software memory area 120 for storing service software 122, a session management information memory area 140 for storing session management information (e.g., a session ID), and a service output memory area 150 for storing image data.

Figure 3:
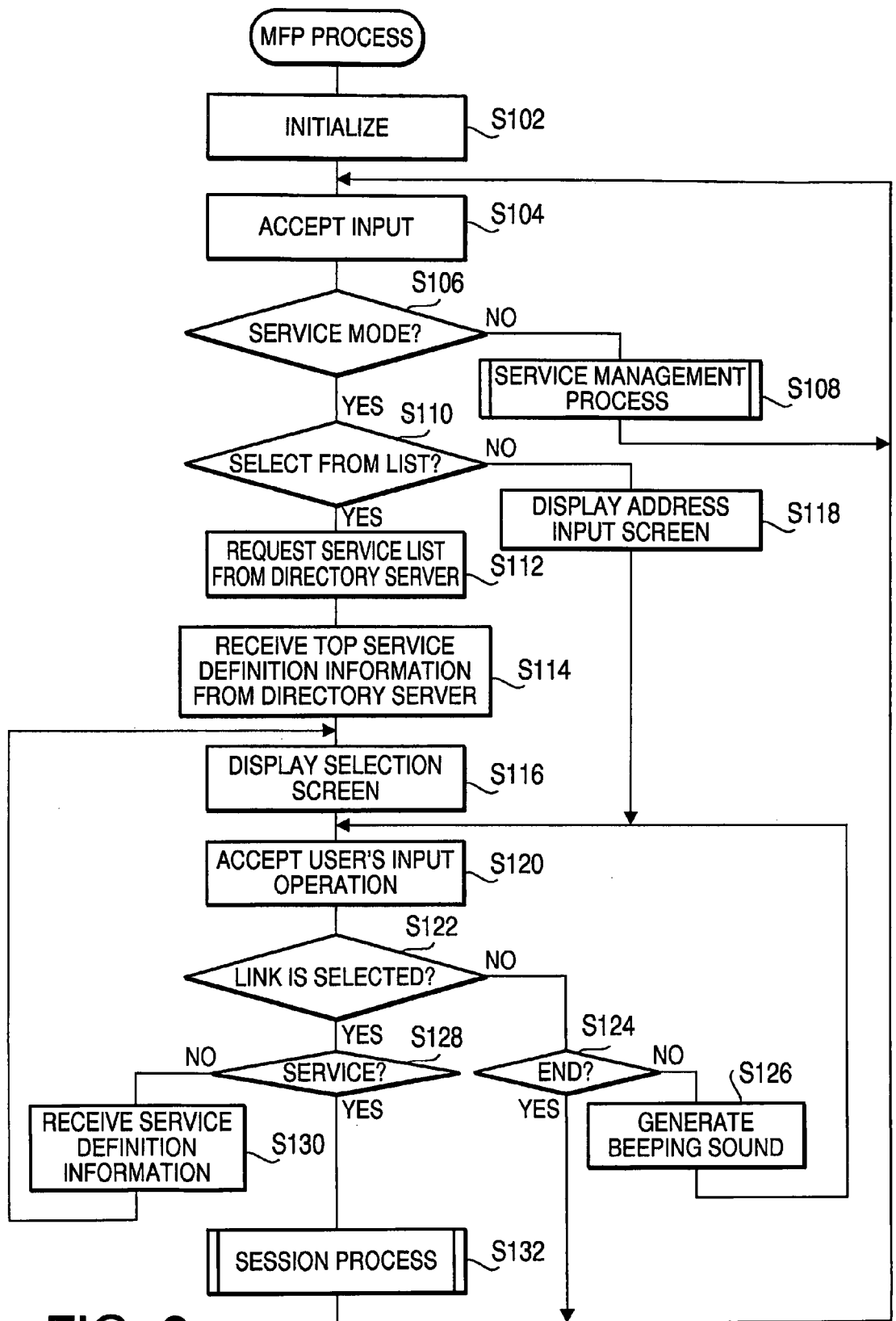
FIG. 3 is a flowchart illustrating a MFP process executed by an MFP.

Hereafter, operations of the MFP 10 will be explained. FIG. 3 is a flowchart illustrating a MFP process which is executed under control of the control unit 11 of the MFP 10. The MFP process is initiated immediately when power of the MFP 10 is turned to ON.

First, in step S102, the control unit 11 executes an initializing process. Then, in step S104, the control unit 11 accepts an input. The input means a command for instructing the MFP 10 to execute a certain process. For example, the input is a key input by a user through the operation unit 12 or a command signal transmitted from an external computer via the network 1.

In step S106, the control unit 11 judges whether the user input instructs the MFP 10 to change to a service mode. For example, if the user operation is an operation of pressing the service key 44, the control unit 11 judges that the user input instructs the MFP 10 to change to a service mode. The service mode means an operation mode for requesting a service from the function server 30.

If the user input does not instruct the MFP 10 to change to the service mode (S106: NO), control proceeds to step S108 where a process corresponding to the user input is executed.

If the user input instructs the MFP 10 to change to the service mode (S106: YES), control proceeds to step S110. In step S110, the control unit 11 displays a selection screen, requesting a user to decide whether the user selects a desirable service (to be requested to the function server 30) from a list or designates directly a URL of a destination of a desirable service, on the display 52. Then, the control unit 11 waits for a user input. If the user input is accepted, the control unit 11 judges whether a service to be requested from the function server 30 is to be selected from a service list (S110).

If it is judged in step S110 that a service to be requested from the function server 30 is to be selected form a service list (S110: YES), control proceeds to step S112 where the control unit 11 sends a request for a service list to the directory server 20. Specifically, in step S112, the control unit 11 requests the service list by sending an HTTP request based on HTTP (HyperText Transfer Protocol) 1.1 (hereafter, simply referred to as an HTTP request) to a destination address stored in the storage unit 16. After receiving the HTTP request from the MFP 10, the directory server 20 sends top service definition information 25 back to the MFP 10 as a HTTP response based on HTTP 1.1. The top service definition information 25 is used by the MFP 10 to display a category selection screen allowing a user to select one of service categories including "Data Storage Service", "Printing Service" and "Copy Application Service".

After the MFP 10 receives the top service definition information in step S114, the control unit 11 generates a selection screen based on the received service definition information 25 and displays the selection screen on the display 52 (S116). Then, control proceeds to step S120.

Figure 4A:
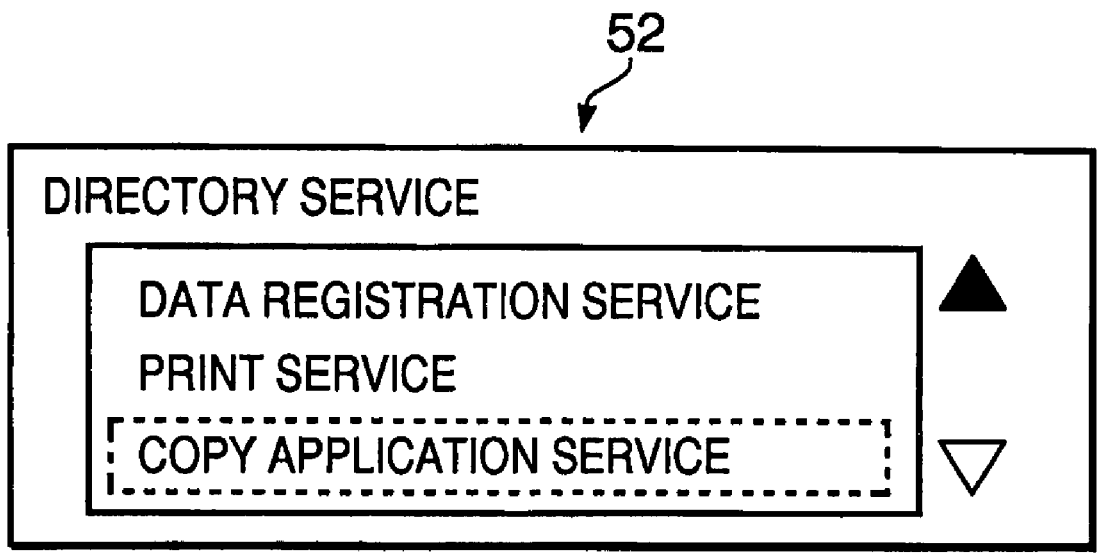
FIG. 4A shows an example of a category selection screen.

When step S116 is executed after the top service definition information 25 is received by the MFP 10, a category selection screen shown in FIG. 4A is displayed on the display 52 of the MFP 10. Specifically, a character string "Directory Service" is displayed at the top of the screen as a display title, and character strings "Data Storage Service", "Printing Service" and "Copy Application Service" are displayed under the display title as selectable categories. Each item on the service selection screen has been associated with an ID of service definition information 25 corresponding to each category. By this configuration, when a selection of an item is confirmed by the user, service definition information 25 having the ID associated with the selected item is obtained from the directory server 20.

Figure 4B:
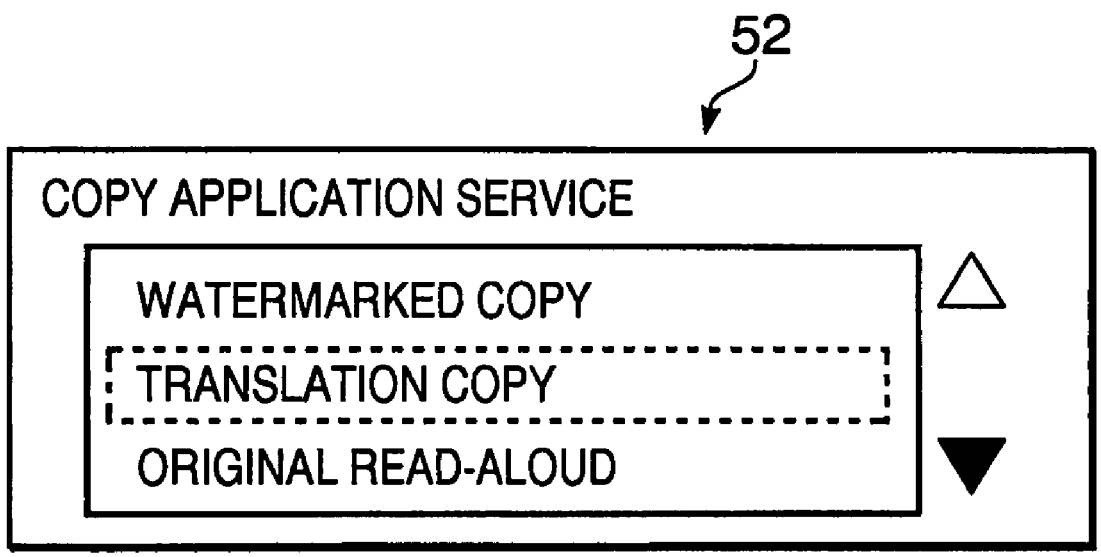
FIG. 4B shows an example of a service selection screen.

As shown in FIGS. 4A to 4C, the MFP 10 displays upward/downward arrows (triangles) on the right side on the display 52 to allow the user to scroll up or down the displayed items if all of the items can not be displayed on the display 52 simultaneously due to the limitations of the size of a display area.

If step S116 is executed after service definition information 25 different from top service definition information 25 (e.g., service definition information 25 regarding "Copy Application Service") is received, a service selection screen shown, for example, in FIG. 4B is displayed on the display 52. Specifically, in the service selection screen, a character string "Copy Application Service" is displayed at the top of the screen as a display title, and service names "Watermarked copy", "Translation Copy", "Original read-aloud", "Voice-Text Conversion", "Translation Retry" are displayed under the display title as selectable items. Each service is associated with an addressed of corresponding service definition information 25. If one of the items is selected by a user through the service selection screen, the MFP 10 requests a service of the selected item from the function server 30.

If it is judged in step S110 that a service to be requested from the function server 30 is not selected form a service list (S110: NO), control proceeds to step S118 where control unit 11 generates an address input screen for allowing a user to directly input a URL, and displays the address input screen on the display 52. Then, control proceeds to step S120.

After the service selection screen or the address input screen is displayed, a user selects one of items, inputs an address, or ends the service mode through use of the operation unit 12.

In step S120, the control unit 11 waits for a user operation performed through the operation unit 12 on the service selection screen or the address input screen. If the user operation is accepted, control proceeds to step S122 where the control unit 11 judges whether the user operation is an operation for selecting a link. Specifically, in step S1122, the control unit 11 judges that the user operation is an operation for selecting a link if a selection is made successfully by a user on the service selection screen displayed in step S116 or if a URL is successfully inputted to the input screen displayed in step S118.

If the user operation is not an operation for selecting a link (S122: NO), control proceeds to step S124 where the control unit 11 judges whether the user operation accepted at step S120 is an operation for ending the service mode. If the user operation is an operation for ending the service mode (S124: YES), control returns to step S104. That is, in this case the process as a service mode terminates.

If it is judged in step S124 that the user operation is not an operation for ending the service mode (S124: NO), control proceeds to step S126 where the control unit 11 produces a beeping sound. Then, control returns to step S120. That is, if the user operation accepted in step S120 is not an operation for selecting a link and is not an operation for ending the service mode, the beep sound is produced so as to notify a user that the user operation is invalid.

If the user operation is an operation for selecting a link (S122: YES), control proceeds to step S128 where the control unit 11 judges whether the selected link is represented by a URL for a service (i.e., the control unit 11 judges whether the selected link is an address for requesting a service from the function server).

If the selected link is not represented by a URL for a service (i.e., the selected link is an address of another piece of service definition information 25) (S128: NO), control proceeds to step S130 where the control unit 11 requests a service list from the directory server 20, and then receives service definition information 25. Then, control returns to step S16 so as to display a new service selection screen on the display 52.

If the selected link is represented by a URL of a service (S128: YES), control proceeds to step S132 where a session process (which is explained in detail later) is executed. After the step S132 is finished, control returns to step S104. The service mode process is thus terminated.

Hereafter, the session process executed in the step S132 of the MFP process (FIG. 3) will be explained referring to a flowchart of FIG. 5.

At the start of the session process, the MFP 10 activates a service corresponding to a link location selected at step S120 (or corresponding to an address if the address is directly inputted by a user) (S202). The MFP 10 sends a service initiation command to the link location as an HTTP request to instruct the function server 30 to initiate a service selected in step S120. After receiving the service initiation command, the function server 30 sends a session ID back to the MFP 10 as an HTTP response.

In response to the service initiation command of S201, the MFP 10 receives a session ID from the function server 30 (S204). Each of HTTP requests and HTTP responses exchanged between the MFP 10 and the function server 30 includes a session ID, and the function server 30 is able to manage devices (i.e., to conduct session management for devices), communicating with the function server 30, in accordance with session IDs contained in HTTP requests or HTTP responses.

Subsequently, the MFP 10 transmits the "MFP command inquiry" (inquiring about instructions to the MFP 10) to the function server 30 (S206). After receiving the MFP command inquiry from the MFP 10, the function server 30 sends a command back to the MFP 10 if a command to be sent to the MFP 10 is issued in processes of the function server 30. If commands to be sent to the MFP 10 do not exist, the function server 30 sends a command representing "no command" back to the MFP 10. In response to the MFP command inquiry of S206, the MFP 10 receives a command from the function server 30 (S208).

Subsequently, the MFP 10 judges whether the command received in S208 is a job initiation command (S210). The job initiation command is issued by the function server 30 after the function server 30 receives the service initiation command. The type of a job to be executed by the MFP 10 is decided by the function server based on various factors including timing of reception of an inquiry and the type of a service to be initiated. A job ID of the job to be initiated, the type of the job, and a destination address of the job are contained in the job initiation command.

If the command received in S208 is a job initiation command (S210: YES), the MFP 10 reserves resources necessary for the initiation of the job (S212), and starts a process for initiating the designated job (S213). The control unit 11 initiates the designated job by passing the job ID and the destination address to the job. The job thus initiated is executed concurrently with other processes. That is, various services can be performed concurrently in the service providing system 100. In this embodiment, a copy application job (corresponding to "Translation Copy" of the "Copy Application Service") and a retry job (corresponding to "Translation Retry" of the "Copy Application Service") will be explained later.

After the job is initiated, the control unit 11 waits a prescribed time interval (S214). Then, control returns to step S206.

If the command received in S208 is not a job initiation command (S210: NO), the MFP 10 judges whether the command is a job end command (S216). The job end command is issued in the function server 30 at the time of termination of the job. A Job ID of the terminated job is contained in the job end command.

If the command received in S208 is a job end command (S216: YES), the MFP 10 ends the job corresponding to the job ID while releasing the resources (S208), and waits the prescribed time interval (S214). Then, control returns to step S206.

If the command received in S208 is not a job end command (S216: NO), the MFP 10 judges whether the command indicates "no command", i.e., whether the response to the MFP command inquiry indicates that there is no command (S220).

If the command received in S208 indicates "no command" (S220: YES), the MFP 10 waits the prescribed time interval (S214), and control returns to step S206.

If the command received in S208 does not indicate "no command" (S220: NO), the MFP 10 judges whether the command is a session end command (S222). The session end command is issued in the function server 30 at the time of termination of the service for the MFP 10.

If the command received in S208 is the session end command (S222: YES), the MFP 10 ends the session process. If the command received in S208 is not the session end command, that is, if the command is none of the job initiation command, the job end command, the "no command" and the session end command (e.g., if the command is an error notification) (S222: NO), the MFP 10 executes a command error process (e.g. displaying an error message on the display 52) (S224). Then, the session process terminates.

Hereafter a copy application service to be executed under control of the control unit 111 of the MFP 10 will be explained with reference to FIG. 6. As described above, the copy application service is one of jobs to be initiated at step S213 of the session process (FIG. 5).

First, the control unit 11 displays an ID input screen requesting a user to input a user ID, on the display 52. After the control unit 11 accepts the user input (S402), the control unit 11 request the function server 30 to initiate a copy application service (S404). Specifically, the control unit 11 sends a service initiation command to a destination address of the copy application service ("Translation Copy") defined in the service definition information 25, together with the accepted user ID, as an HTTP request. After receiving the service initiation command, the function server 30 sends a first parameter request back to the MFP 10, together with the session ID, as an HTTP response.

As described in detail later, the first parameter request is issued in the function server 30 after the function server 30 receives the service initiation command, and is XML data for requesting a first parameter (e.g., a manner of translation) from the MFP 10.

In step S406, the control unit 11 receives the first parameter request and the session ID from the function server. The received session ID is stored in the storage unit 16, and is used for communication with the function server 30.

Figure 8A:
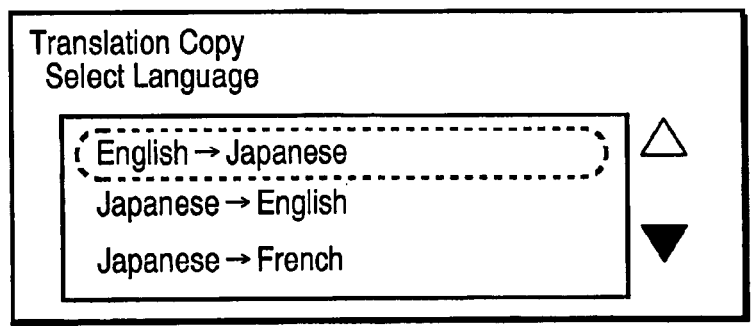
FIGS. 8A to 8E show examples of a parameter input screens.

Next, the control unit 11 displays a parameter input screen requesting a user to designate a first parameter based on the first parameter request, on the display 52 (S408). FIG. 8A is an example of a parameter input screen displayed on the display 52. As shown in FIG. 8A, a string "Translation Copy" is displayed at the top portion of the screen as a display title, and items "English→Japanese", "Japanese→English" and "Japanese→French" are displayed under the display title as selectable items. After the parameter input screen is displayed, the user is able to select one of the items as a first parameter (i.e., a manner of translation).

After the user operation for designating the first parameter is conducted through the parameter input screen (S410), the control unit 111 sends the first parameter to the function server 30 as an HTTP request. After receiving the first parameter, the function server 30 sends a second parameter request back to the MFP 10 as HTTP response (S412). As described later, the second parameter is issued in the function server 30 after the function server 30 receives the first parameter, and is XML data for requesting image data to be obtained by reading an original (which is a target of translation), from the MFP 10.

Figure 8B:
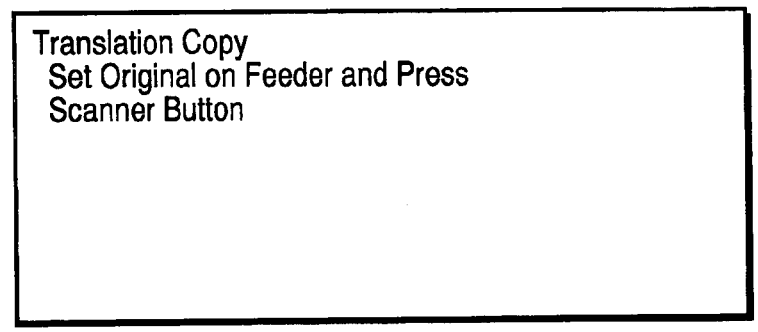

After receiving the second parameter request from the function server 30 (S414), the control unit 11 displays a parameter input screen for requesting a user to conduct a user operation for producing a second parameter (S416). FIG. 8B shows an example of a parameter input screen for the second parameter. As shown in FIG. 8B, a string "Translation Copy" is displayed at the top portion of the screen as a display title, and a message requesting a user to set an original to be translated on a feeder (for supplying originals to the reading unit 13) is also displayed under the display title.

After the parameter input screen is displayed, the user sets an original on the feeder, and operates the operation unit 52 (e.g. presses the scanner key 42) so as to cause the reading unit 13 to read the original and produce image data of the original as the second parameter.

After the user operation for producing the second parameter is finished (S418), the control unit 11 starts to send the second parameter to the function server 30 as an HTTP request (S420). Specifically, in step S420, the control unit 11 prepares a header and length data for each data blocks, produced by the reading unit by one reading operation, and adds the header and length data to each data block. The data block corresponds to, for example, a page of information. The data blocks produced as above are transmitted sequentially to the function server 30.

After the function server 30 finishes transmitting the second parameter (image data blocks), the function server 30 sends converted image data (e.g., image data including a translated text part) back to the MFP 10 as an HTTP response.

If no error arises by the time the transmission of the image data blocks is finished (S422: NO), control proceeds to step S428. If a reading error (an error in a reading process of the reading unit 13) or a transmission error (an error in a transmitting process for the second parameter) arises by the time the transmission of the image data blocks is finished (S422: YES), control proceeds to step S424. In step S424, the control unit 11 prepares an error notification indicating that an error arises, and sends reading status information indicating to what extent the reading of the originals by the reading unit 13 is finished (e.g., the number of the page to which the reading of the originals is finished), to the function server 30, together with the error notification, as an HTTP request. That is, the number of the image data block to which the reading of the originals is finished is sent to the function server 30.

After receiving the error notification and the reading status information, the function server 30 sends an acknowledgement (ACK) back to the MFP 10 as an HTTP response. In step S426, the control unit 11 receives the acknowledgement from the function server. Then, control proceeds to step S428.

Specifically, after the function server 30 receives the error notification, the function server 30 sends a third parameter request as an HTTP response to the MFP 10. The third parameter request is issued in the function server 30 after the function server 30 receives the error notification, and is XML data which contains a message indicating that the reading of the originals is not successfully completed and requests the MFP 10 (the user of the MFP 10) to designate a manner of restarting defining a manner of restarting a service. By this configuration, the providing of the service by the function server 30 is suspended after the occurrence of an error and before the restart of transmission of the converted image data.

Figure 8C:
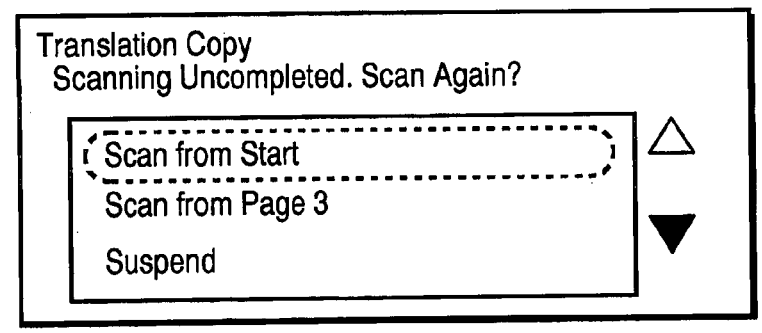

After the control unit 11 receives data from the function server 30 (S428), the control unit 11 judges the received data is the converted image data (S430). If the received data is not the converted image data (i.e., the received data is the third parameter request (S430: NO), the control unit 11 displays a parameter input screen requesting a user to designate a third parameter, on the display 52 (S432). FIG. 8C shows an example of the parameter input screen displayed on the display 52. As shown in FIG. 8C, a string "Translation Copy" is displayed at the top portion of the screen as a display title, a message indicating that the scanning of the originals is unfinished is displayed under the display title, and manners of restarting "Scan from the Start" (indicating that the input of the second parameter is executed from the start), "Scan from the page X" (indicating that the input of the second parameter is restarted from a midway stage), and "Suspend" (indicating that the input of the second parameter is suspended) are displayed under the message as selectable items. The number of the page from which the scanning is to be restarted ("X") is determined by the function server 30.

After the parameter input screen is displayed, the user is able to designate one of the items as the third parameter (the manner of restarting) through the parameter input screen. After the user designates the third parameter through the parameter input screen (S434), the control unit 11 sends the third parameter designated by the user to the function server 30 as an HTTP request (S436).

The function server 30 which received the third parameter from the MFP 10 sends again the second parameter request if the third parameter is not "Suspend", while the function server 30 sends a suspend confirmation indicating the suspend of the service to the MFP 10 if the third parameter is "Suspend". In step S438, the control unit 11 judges whether the third parameter is the "Suspend".

If the third parameter is not "Suspend" (S438: NO), control returns to step S414 because in this case the second parameter is transmitted from the function server 30. More specifically, the second parameter from the function server 30 is XML data requesting image data of the whole originals from the MFP 10 if the third parameter indicates that the input of the second parameter needs to be executed from the start, while the second parameter from the function server 30 is XML data requesting image data of a part of the originals (e.g., the image data from the page "X" of the originals) from the MFP 10 if the third parameter indicates that the input of the second parameter needs to be executed from a midway stage. In the latter case, for example, a parameter input screen shown in FIG. 8D is displayed on the display 52.

Figure 8D:
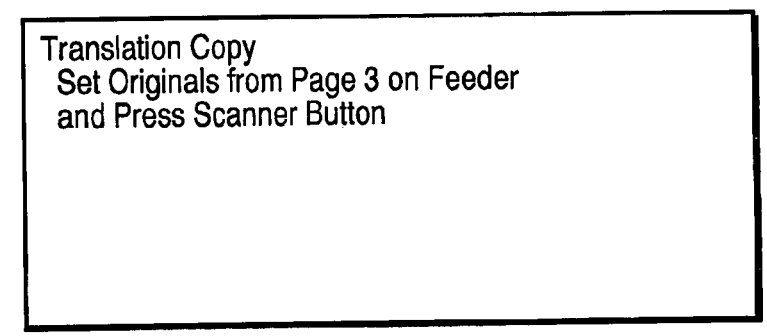

As shown in FIG. 8D, on the parameter input screen, a string "Translation Copy" is displayed at the top portion of the screen as a display title, and a message for requesting a user to sent the originals paged from "X" on the feeder, and to press the scanner key is displayed under the display title. After the parameter input screen generated as above is displayed, the user sets the originals paged from "X" on the feeder, and presses the scanner key 42 so as to produce the second parameter.

If the third parameter is "Suspend" (S438: YES), control proceeds to step S440 where the control unit 11 receives a suspend confirmation from the function server 30. Next, the control unit 11 registers unsolved session management information representing up-to-date information concerning the session in the session management information memory area (S442). FIG. 9 shows an example of a data structure of the unsolved session management information stored in the session management information. As shown in FIG. 9, the unsolved session management information is form as a database in which a session ID, a service name and a time are associated with each other. In step S442, the session ID currently used, a string formed be linking the words "Translation Copy" representing the current service and the words of the third parameter, and a time when step S442 is processed are stored in the database (unsolved session management information).

Next, the control unit 11 sends a service end command for terminating the copy application service to the function server 30 as an HTTP request. Then, the copy application job terminates. After receiving the service end command, the function server 30 sends a session end command back to the MFP 10. As described above, the session end command is received by the MFP 10 in step S208 and is checked (S222: YES) in the session process of FIG. 5.

If the date received in step S428 is the converted image data (S430: YES), control proceeds to step S444 where a print process is executed. Specifically, in step S444, an image of an image data block is printed on a recording medium by the recording unit 14 each time the image data block (i.e., image data corresponding to a page of an original) is received.

If an error (e.g., a reception error of the converted image data or a print error such as a jam) arises during the printing operation (S446: YES), print status information indicating to what extent the printing of the converted image data by the recording unit 14 is finished (e.g., the number of the image data block to which the printing is finished) is sent to the function server 30, together with an error notification for notifying the occurrence of an error, as an HTTP request (S448).

After receiving the error notification, the function server 30 sends a fourth parameter request back to the MFP 1 as an HTTP response. The fourth parameter request is issued in the function server 30 after the function server 30 receives the error notification, and is XML data which includes a message indication that the printing of images is not successfully completed and which is a request for requesting the MFP 10 to designate the manner of restarting. With this configuration, control does not proceeds to steps following the printing process while an error arises in the printing process, and therefore the providing of the service by the function serer 30 is suspended.

Figure 8E:
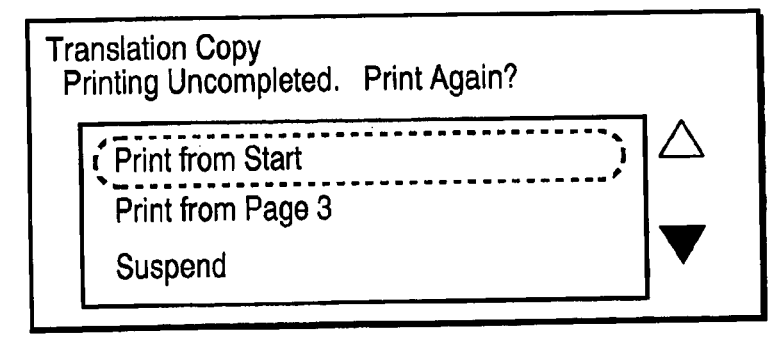

After receiving the fourth parameter request from the function server 30 (S450), the control unit 11 generates a parameter input screen based on the fourth parameter request and displays it to request a use to designate a fourth parameter on the display 52 (S452). FIG. 8E shows an example of a parameter input screen displayed on the display 52. As shown in FIG. 8E, a string "Translation Copy" is displayed at the top portion of the screen as a display title, and a message indicating that the printing is not finished successfully is also displayed under the display title. Under the message, manners of restarting "Print from the Start" (indicating that the printing is executed from the start), "Print from the page X" (indicating that the printing is restarted from a midway stage), and "Suspend" (indicating that the printing is suspended) are displayed as selectable items. After the parameter input screen is displayed, the user is able to designate one of the selectable items as the fourth parameter.

After a user operation for designating the fourth parameter is conducted (S454), the control unit 11 sends the fourth parameter to the function server 30 as an HTTP request (S456). After receiving the fourth parameter, the function server 30 sends again the converted image data to the MFP 10 as an HTTP response if the fourth parameter (the designated manner of restarting) is intended for suspend of the printing, while the function server 30 sends a suspend confirmation for notifying the MFP 10 of suspend of the service, to the MFP 10 as an HTTP response if the fourth parameter (the designated manner of restarting) is not intended for suspending the printing.

If the fourth parameter sent in step S456 is not intended for the suspend of the printing (S458: NO), control returns to step S444 to start the printing process for the converted image data because in this case the converted image data is transmitted again from the function server 30 as an HTTP response. Specifically, the function server 30 sends the converted image data from the start (i.e., the entire converted image data) if the fourth parameter transmitted in step S456 is "Print from the Start", while the function server 30 sends the image data blocks from the page X if the fourth parameter transmitted in step S456 is "Print from the page X". It is understood that in the latter case, images of the image data blocks from the page X are printed on recording medium when the printing process is executed after control returns from step S458 to S444.

If the fourth parameter sent in step S456 is intended for the suspend of the printing (S458: YES), control proceeds to step S460 where the control unit 11 receives a suspend command transmitted from the function server 30. Then, the control unit 11 stores up-to-date information concerning the session in the unsolved session management information (S462). In step S462, the control unit 11 stores the used session ID, the third parameter designated in step S434 as a service name, and the time when step S442 is processed are stored in the database while associating the session ID, the third parameter and the time with respect to each other (see FIG. 9).

Next, the control unit 11 sends the service end command to the function server 30 as an HTTP request (S463). Then, the copy application job terminates.

If no error arises (i.e., a reception error or a print error does not arise) during the printing process started in step S444 (S446: NO), the control unit 11 sends an end notification indicating that the printing process is successfully finished to the function server 30 as an HTTP request (S464). After receiving the end notification, the function server 30 sends a confirmation response back to the MFP 10 as an HTTP response.

In step S466, the control unit 11 receives the confirmation response from the function server 30. If the information concerning the session ID being used is stored in the unsolved session management information (for example, in step S442), the control unit 11 deletes the session ID and the corresponding information from the unsolved session management information (S468). Then control proceeds to step S463.

Hereafter, a retry job executed under control of the control unit 11 of the MFP 10 will be explained with reference to FIGS. 10 and 11. The retry job is executed as one of the jobs initiated in step S213 of the session process.

Figure 12:
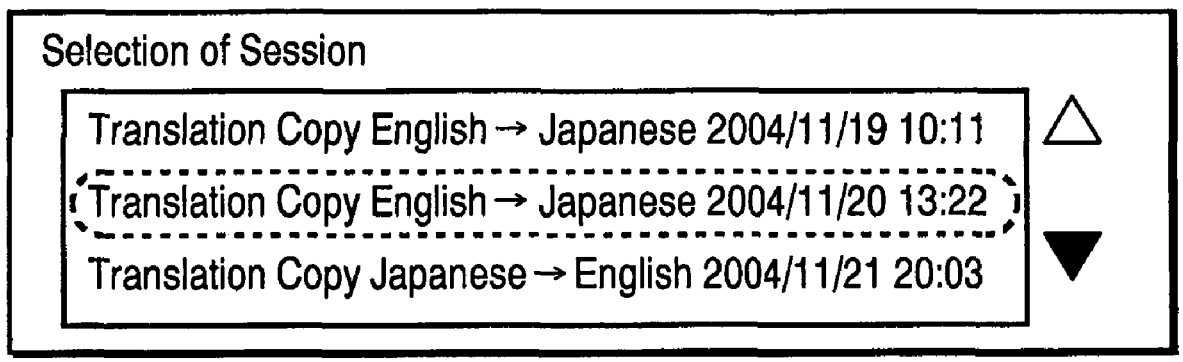
FIG. 12 shows an example of a session election screen.

First, the control unit 11 displays an ID input screen for requesting a user to input a user ID on the display 52 (S502). After a user operation for inputting a user ID is conducted through the ID input screen (S502), the control unit 11 displays a session selection screen on the display 52 so as to request a user to select a session (S504). FIG. 12 shows an example of the session selection screen displayed on the display 52. As shown in FIG. 12, a string "Selection of Session" is displayed at the top portion of the screen as a display title, selectable items each of which is represented as words formed by merging the service name and the time information registered in the unsolved session management information are displayed under the display title.

After the session selection screen is displayed, the user is able to select one of the items (service names) through the operation unit 12.

After a user operation for selecting a service name is conducted (S506), the control unit 11 causes the function server 30 to initiate the copy application service (retry of translation) based on the session ID registered in the unsolved session management information in association with the selected service name (S508). Specifically, the control unit 11 sends a service initiation command to the address of the copy application service designated by the service definition information 25, together with the inputted user ID and the session ID corresponding to the selection in step S506, so that the function server 30 initiates the copy application service (retry of translation). The service initiation command is sent to the function server 30 as an HTTP request.

After the function server 30 receives the service initiation command, the function server 30 sends the third parameter request or the fourth parameter request to the MFP 10.

In step S510, the control unit 11 receives data from the function server 30 which has received the service initiation command in step S508. Next, the control unit 11 judges whether the received data is the third parameter request. If the received data is the third parameter request (S530: YES), control proceeds to step S532 where the control unit 11 requests a user to conduct a user operation for designating the third parameter as in the case of step S432 of FIG. 6 (S532). If the received data is the fourth parameter (S530: NO), the control unit 11 requests a user to conduct a user operation for designating the fourth parameter as in the case f step S452.

Figure 6:
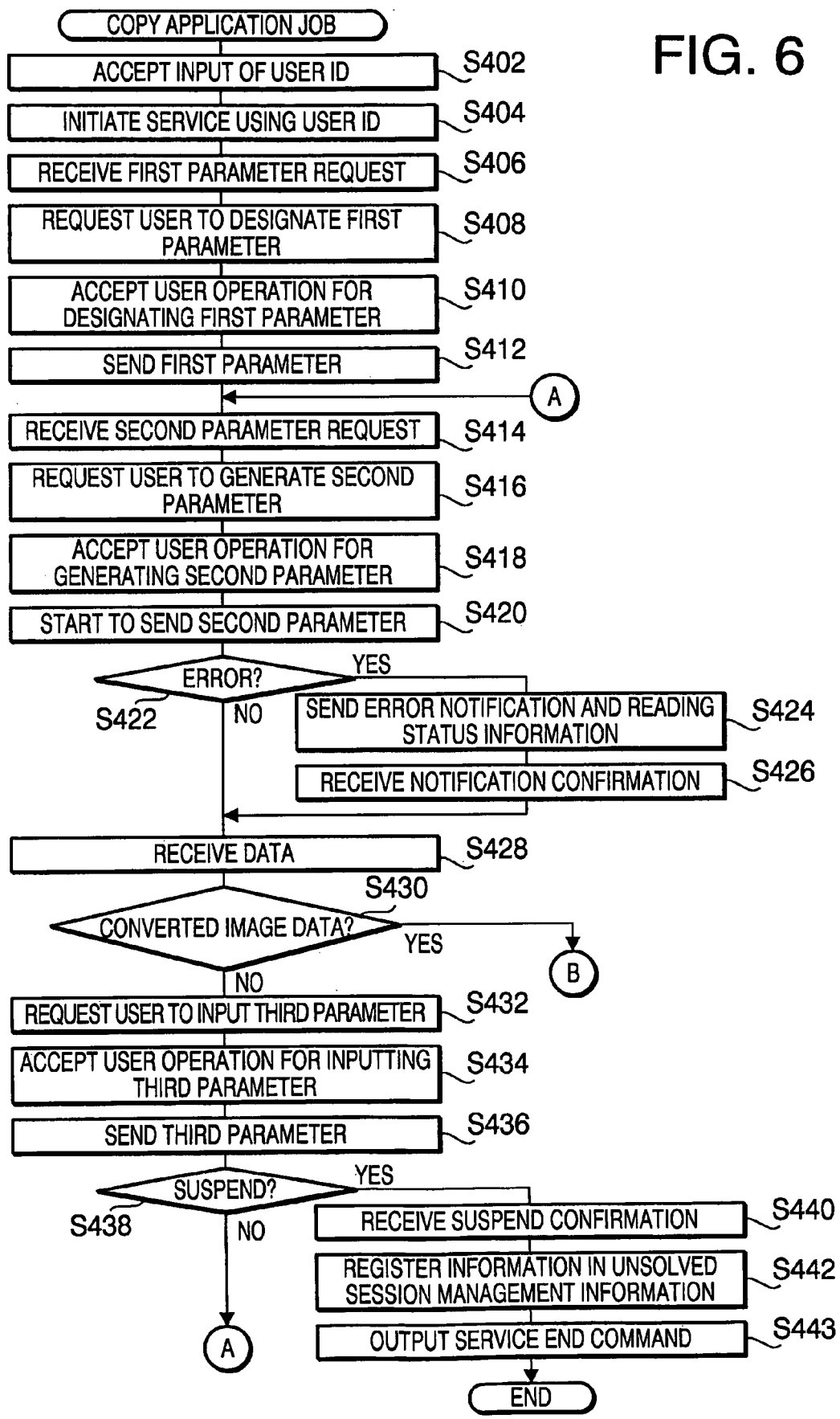
FIGS. 6 and 7 show a flowchart of a copy application job executed by the MFP.
Figure 7:
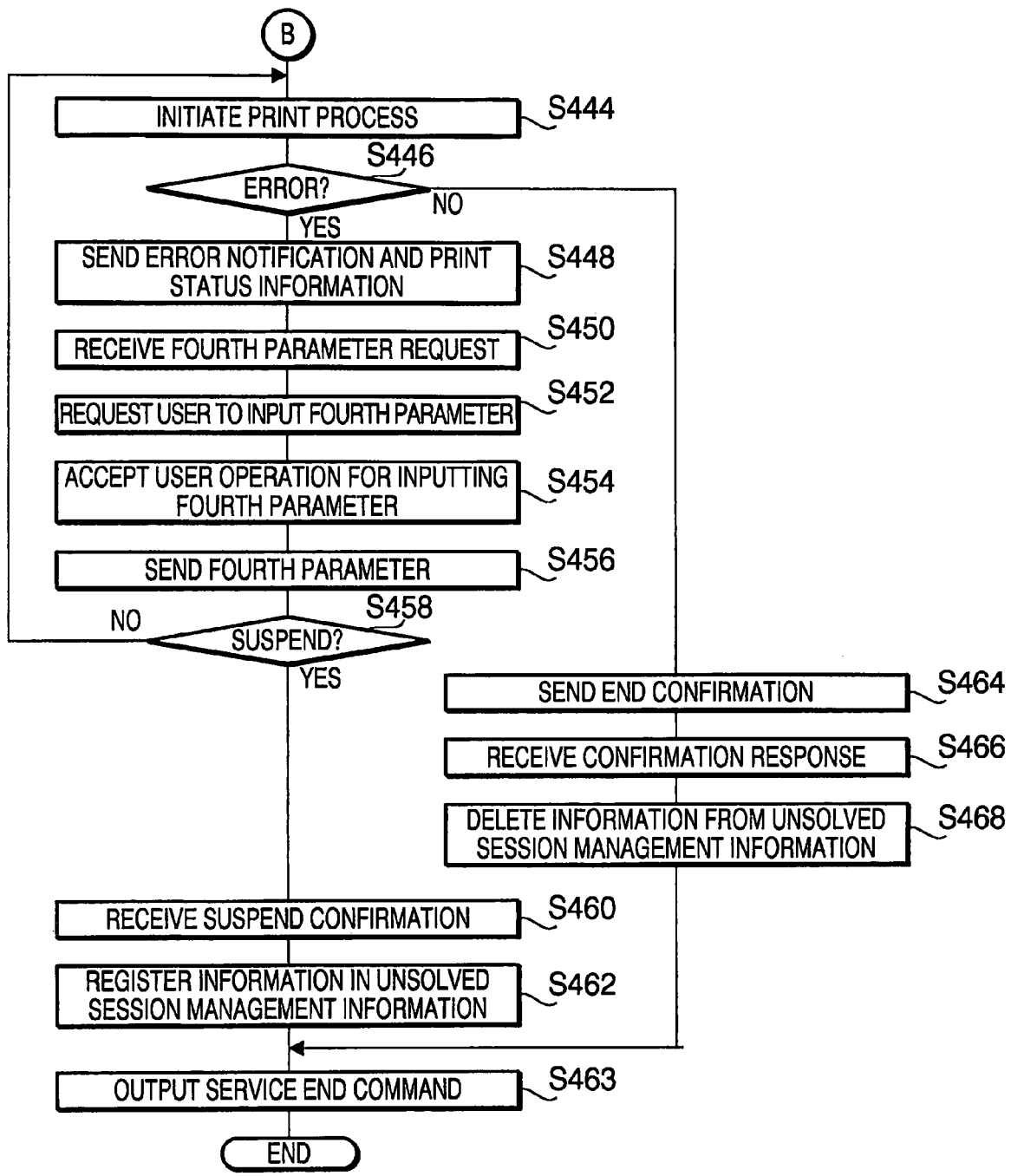

Subsequently, steps which are the same as those show in FIGS. 6 and 7 are processed. That is, steps S514 to S543 are the same as steps S414 to S443 of FIG. 6, and steps S544 to S563 are the same as steps S444 to S463 of FIG. 6. Therefore, explanations of steps S514 to S543 and steps S544 to S563 will not be repeated.

Figure 13:
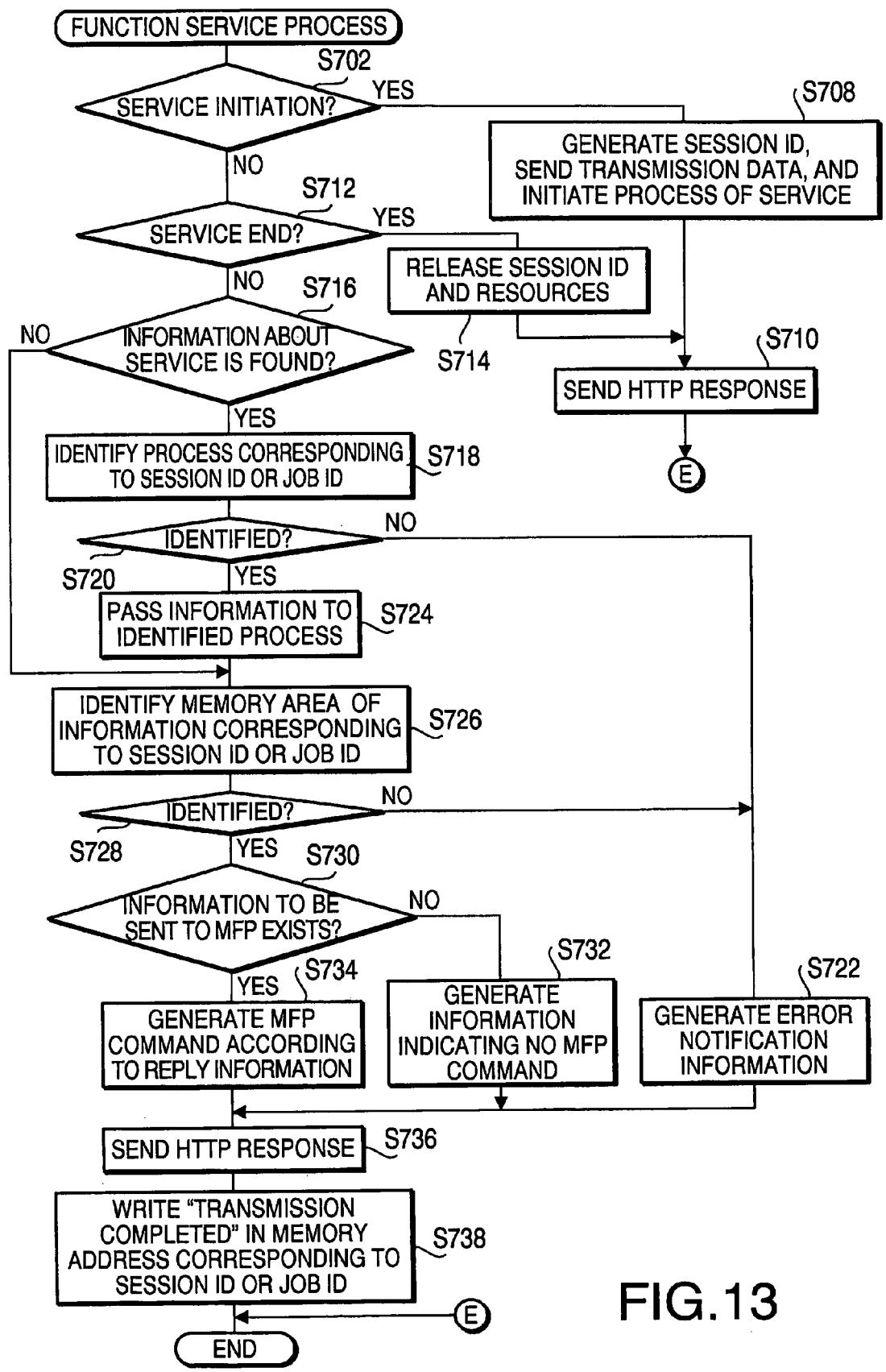
FIG. 13 is a flowchart illustrating a function server process executed by a function server provided in the service providing system.

Hereafter, operations performed by the function server 30 will be explained. FIG. 13 is a flowchart illustrating a function server process to be executed under control of the control unit 31 of the function server 30. The function server process is started each time the function server 30 receives an HTTP request.

First, the function server 30 judges whether the received HTTP request is the service initiation command (S702). Incidentally, the service initiation command is transmitted by the MFP 10 in step S202 of the session process (FIG. 5).

If the received HTTP request is the service initiation command (S702: YES), the control unit 31 generates a session ID and transmission data representing the session ID, secures resources for execution of a service, and then initiates a session process (see FIG. 14) (S708). Next, the control unit 31 sends the transmission data back to the MFP 10 as an HTTP response (S710). Then, the function server process terminates. It should be noted that the transmission data (session ID) is received by the MFP 10 in step S204 of the session process of the MFP 10 (see FIG. 5).

If it is judged in step S702 that the HTTP request is not the service initiation command (S702: NO), the control unit 31 judges whether the HTTP request is a service end command (S712). It should be noted that the service end command is transmitted from the MFP 10 in step S443 (see FIG. 6), step S463 (see FIG. 7), step S543 (see FIG. 11) and step S563 (see FIG. 11), or the service end command is transmitted from the MFP 10 when a user operation for terminating the service (e.g., pushing the cancel key 51) is conducted.

If the HTTP request is a service end command (S712: YES), the control unit 31 releases the session ID and the resources secured in step S708, and generates a session end command (S714). Next, the control unit 31 sends the session end command back to the MFP 10 as an HTTP response (S710). Then, the function server process terminates. It should be noted that the session end command is received by the MFP 10 in step S208, and reception of the session end command is confirmed in step S222 as shown in FIG. 5.

If it is judged in step S712 that the HTTP request is not a service end command (S712: NO), the control unit 31 judges whether the HTTP request contains information about a service (S716). Specifically, the control unit 31 judges whether the HTTP request is issued by the MFP 10 in one of the session process and another job.

If the HTTP request contains information about the service (S716: YES), the control unit 31 identifies the process (the session process or job) that has transmitted the HTTP request (S718). If the process can not be identified (S720: NO), control proceeds to step S722 where the function server 30 generates error notification information. Then, control proceeds to step S736.

If the process can be identified (S720: YES), the function server 30 sends the information supplied together with the HTTP request, to the identified process (S724). Then, control proceeds to step S726. If no information about the service is contained in the HTTP request (S716: NO), control directly proceeds to step S726. In step S726, the control unit 31 identifies a memory area storing information corresponding to the session ID or job ID.

Subsequently, the function server 30 judges whether the memory area storing the information corresponding to the session ID or job ID can be identified (S728). If the memory area can not be identified (S728: NO), the function server 30 generates error notification information (S722). Then, control proceeds to step S736.

If the memory area can be identified (S728: YES), the function server 30 judges whether there exists reply information to be sent back to the MFP 10 (S730). If there exists the reply information to be sent back to the MFP 10 (S730: YES), the function server 30 generates an MFP control command based on the return information (S734). Then, control proceeds to step S736. If there exists no replay information to be sent back to the MFP 10 (S730: NO), the function server 30 generates information indicating "no MFP command" (S732). Then, control proceeds to step S736.

In step S736, the control unit 31 sends information generated in one of steps S722, S732 and S734 to a client device (i.e., the MFP 10) as an HTTP response. The error notification information generated in step S722 is received by the MFP 10 in step S208, and is used in step S224. The information of "no command" is received by the MFP 10 in step S208, and reception of the "no command" is confirmed in step S220. The MFP control command generated in step S734 varies depending on the job type, and is received by the MFP 10 in the corresponding job.

In step S738, the control unit 31 assigns information "transmission completion" to a memory having an address corresponding to the session ID or job ID. Then, the function server process terminates.

Figure 14:
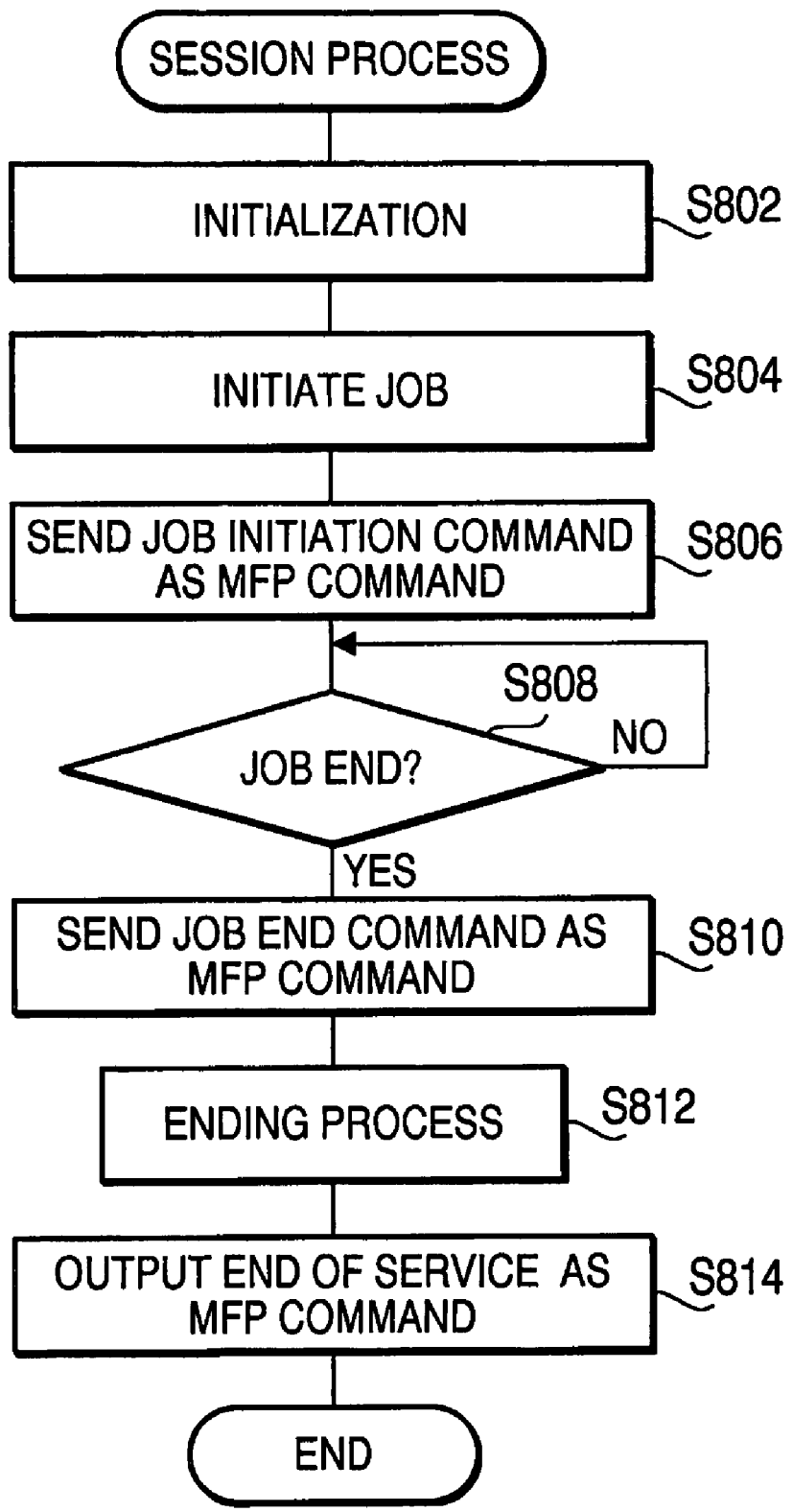
FIG. 14 is a flowchart illustrating a server side session process executed by the function server.

Hereafter, a session process (a server side session process) executed under control of the control unit 31 of the function server 30 will be explained with reference to FIG. 14. The session process is executed concurrently with the function server process.

First, the control unit 31 executes an initialization process (S802). Next, the control unit 31 initiates a job corresponding to the service designated by the service initiation command (S804). It should be noted that the service initiation command is issued by the MFP 10 in step S202, and reception of the service initiation command is confirmed by the function server 30 in step S702 of the function server process.

Next, in step S806, the control unit 31 issues an MFP command corresponding to the initiated job. Specifically, in step S806, the control unit 31 writes a job initiation command in a memory area for storing reply information, together with a job ID and a destination address. Based on the reply information, the MFP command is generated in step S734, and the reply information is sent to the MFP 10 as a job initiation command. The job initiation command is received by the MFP 10 in step S208 (see FIG. 5), and the job designated by the job initiation command is initiated by the MFP in step S213.

Next, the control unit 31 waits until the job initiated in step S804 terminates (S808: NO). If the job terminates (S808: YES), the control unit 31 sends a job end command for the initiated job to the MFP 10 as an MFP command (S810). Specifically, the control unit 31 writes the job end command and the job ID in the memory area for the reply information. Based on the reply information, the MFP command is generated in step S734, and the reply information is sent to the MFP 10 as a job end command. The job end command is received by the MFP 10 in step S208 (see FIG. 5), and the job designated by the job end command is terminated in the MFP 10 in step S218.

Next, in step S812, the control unit 31 executes an end process including a process for releasing the resources for the job. Then, the session process of the function server 30 terminates (S814). Specifically, in step S814, the control unit 31 writes the session end command in the memory area for storing the reply information. Based on the reply information, the MFP command is generated in step S734, and the reply information is sent to the MFP 10 in step S736. The session end command is received by the MFP 10 in step S208 (see FIG. 5), and the reception of the session end command is confirmed by the MFP 10 in step S222.

Hereafter, a copy application job executed under control of the control unit 31 of the function server 30 will be explained with reference to FIG. 15. The copy application job is executed as one of the jobs to be initiated in step S804 of the server side session process.

First, the control unit 31 receives a user ID and a service initiation command (S902). Then, the control unit 31 generates a session ID for conducting session management with the MFP 10, and stores it in the session management information memory area 140 (S904). FIG. 16 shows an example of a data structure of the session management information stored in the session management information memory area 140. As shown in FIG. 16, the session management information is formed as a database in which a session ID, a user ID and file information, phase information, a manner of translation are associated with each other. In step S904, the session ID generated in step S904 and the user ID received in step S902 are stored in the database while the session ID and the user ID are associated with each other.

Next, the control unit 31 sends a first parameter request to the MFP 10 as an HTTP request (S906). The first parameter request is received by the MFP 10 in step S406 of FIG. 6, and is XML data for requesting the MFP 10 to send a first parameter (a manner of translation in this embodiment). After the MFP 10 receives the first parameter request, the MFP 10 sends a first parameter to the function server 30 as an HTTP request.

In step S908, the control unit 31 receives the first parameter from the MFP 10, and registers the manner of translation represented by the first parameter in the session management information (S909). That is, the manner of translation represented by the first parameter received in step S908 is registered in the session management information for the session ID generated in step S904.

Next, the control unit 31 sends a second parameter request to the MFP 10 as an HTTP response (S910). The second parameter request is an HTTP response received by the MFP 10 in step S414 of FIG. 6, and is XML data for requesting the MFP 10 to send a second parameter (i.e., image data obtained by scanning originals). After the MFP 10 receives the second parameter request, the MFP 10 sends a second parameter in step S420 as an HTTP request.

In step S912, the control unit 31 starts to receive the second parameter. Then, in step S914, the control unit 31 initiates a phase update process. The phase update process is executed as follows. In the phase update process, a file name (created for the session ID generated in step S904) and phase information (e.g., a string "Translation Scan_Page X") are registered in the session management information while being associated with the session ID generated in step S904 as shown in FIG. 16. Subsequently, the control unit 31 updates the string "..._page X" (i.e., increments the page number X) in the session management information each time an image data block (i.e., a unit of data used in data communication for the second parameter) is received.

The control unit 31 judges whether each image data block is successfully received based on a page header and a data length added to each image data block. The second parameter received as above is stored in the service output memory area 150 as image data having a name equal to the corresponding file name. The phase update process is executed concurrently with the copy application job. If the reception of the second parameter is finished or the error notification is received, the phase update process is forced to terminate.

If the control unit 31 receives the error notification and reading end information from the MFP 10 before the phase update process is finished (S916: YES), the control unit 31 sends an acknowledgement (ACK) to the MFP 10 as an HTTP response (S918). The acknowledgement is received by the MFP 10 in step S428.

Next, in step S920, the control unit 31 sends a third parameter request as an HTTP response to the second parameter for which the reception is initiated in step S912. The third parameter request is a HTTP response received by the MFP 10 in step S428 of FIG. 6 and is XML data for requesting the MFP 10 to send a third parameter (i.e., a manner restarting). After the MFP 10 receives the third parameter request, the MFP 10 sends the third parameter to the function server 30 in step S436 as an HTTP request. The third parameter request generated and transmitted in step S920 so that information indicating that the input of the second parameter is to be restarted from a midway stage (i.e., a string indicating that the scanning is restarted from a certain page) is displayed on the MFP 10. The certain page means a page having a page number identified by the reading end information received in step S916 (i.e., a page to which the reading by the MFP 10 is finished).

In step S922, the control unit 31 receives the third parameter from the MFP 10. Then, the control unit 31 judges whether the third parameter is intended for suspend of the input of second parameter. If the third parameter is not intended for the suspend of the input of second parameter (i.e., the second parameter indicates that the input of the second parameter is to be restarted from a midway stage or indicates that the input of the second parameter is to be restarted from the start) (S924: NO), control returns to step S910 to re-execute the reception of the second parameter from step S910.

It should be noted that the second parameter request is formed as XML data for requesting the MFP 10 to send image data obtained by scanning all of the originals if the third parameter indicates that the input of the second parameter is to be restarted from the start, while the second parameter request is formed as XML data for requesting the MFP 10 to send image data obtained by scanning the originals from the page X+1 (where page X is contained in the phase information registered in the session management information obtained at the time when the third parameter is received) (see FIG. 8C).

If the received third parameter is intended for the suspend (S924: YES), the control unit 31 sends a suspend confirmation confirming the suspend of the copy application service, to the MFP 10 as an HTTP response (S926). Then, the copy application job terminates. The suspend confirmation transmitted in step S926 is received by the MFP 10 in step S440 of FIG. 6. After the MFP 10 receives the suspend confirmation, the MFP 10 sends the service end command in step S443 as an HTTP request (see FIG. 6). The reception of the service end command is confirmed in step S712 of the function server process (S712: YES).

If error notification is not received before the first phase update process is finished (S916: NO), the control unit 31 changes the phase information in the session management information to information indicating that the process for receiving the second parameter is finished (S932). Specifically, the session management information is updated such that the phase information associated with the session ID corresponding to the session ID generated in step S904 is changed to "Translation Scan_Completed" (see FIG. 16).

Next, the control unit 31 generates converted image data to be printed out by the MFP 10, by performing image processing for the image data represented by the received second parameter. Specifically, step S934 is processed as follows. The control unit 31 reads the image data having a file name which is associated with the session ID (generated in step S904) in the session management information, from the service output memory area 150. Then, the control unit 31 executes an OCR (Optical Character Recognition) process for the image data to extract textual information (text data) from the image data.

Then, the control unit 31 translates words in the text data in accordance with the manner of translation stored in the session management information while being associated with the session ID generated in step S904. The translated text data is converted to image data (i.e., the converted image data) to be printed as an image. Then, the converted image data is overwritten on the service output memory area 150 as data having a name equal to the file name corresponding to the session ID generated in step S904.

Next, the control unit 31 sends the converted image data to the MFP 10 as an HTTP response (S936). The converted image data is received by the MFP 10 in step S444 of FIG. 7. After the MFP 10 receives the converted image data, the MFP 10 sends the end notification to the function server 30 in step S448 as an HTTP request if the printing of the converted image data is successfully finished in the MFP 10. If an error arises before the printing of the converted image data is finished, the MFP 10 sends the error notification and the printing status information to the function server 30 as an HTTP request.

In step S938, the control unit 13 receives data from the MFP 10 which has received the converted image data. If the data from the MFP 10 is the error notification and the printing status (S940: YES), control proceeds to step S942 where the phase information in the session management information is changed to information indicating that the printing of the converted image data is finished to a certain phase. Specifically, the phase information, which is stored in the session management information while being associated with the session ID generated in step S904, is changed to "Translation Print_PageX". The page number X of the phase information is equal to the number represented by the printing status information transmitted from the MFP 10 together with the error notification.

Next, the control unit 31 sends a fourth parameter request to the MFP 10 as an HTTP response (S944). The fourth parameter request is received by the MFP 10 in step S450 of FIG. 4. After the MFP 10 receives the fourth parameter request, the MFP 10 sends a forth parameter (a manner of restart) to the function server 30 in step S456 as an HTTP request. The fourth parameter request is formed so that a string indication that the print is restarted from a midway stage (i.e., the printing is restarted from a certain page) is displayed. The certain page means the page X+1 (where "X" is the page number stored in the phase information).

In step S946, the function server 30 receives the fourth parameter from the MFP 10. Then, the control unit 31 judges whether the fourth parameter is intended for the suspend. If the fourth parameter is not intended for the suspend (i.e., the fourth parameter indicates that the printing us restarted from the start or the fourth parameter indicates that the printing is restarted from a midway stage) (S948: NO), control returns to step S936 so as to re-execute the copy application job from the transmission of the converted image data. The converted image data to be transmitted is the whole converted image data if the fourth parameter indicates that the printing of the converted image data is to be executed from the start, while the converted image data to be transmitted contains image data blocks from the page X+1 (where the page X is represented by the phase information stored in the session management information st the time when the fourth parameter is received).

If the received fourth parameter is intended for the suspend (S948: YES), the control unit 31 sends the suspend confirmation confirming the suspend of the copy application service to the MFP 10 as an HTTP request (S950). Then, the copy application job terminates.

The suspend confirmation transmitted in step S950 is received by the MFP 10 in step S460 of FIG. 7. After the MFP 10 receives the suspend confirmation, the MFP 10 sends the service end command in step S463 as an HTTP request. The reception of the service end command is confirmed in step S712 of FIG. 13.

If the data received form the MFP 10 is not the error notification and the printing status information (i.e., the received data is the end notification) (S940: NO), the control unit 31 sends the confirmation response to the MFP 10 as an HTTP response (S954). Then, the copy application job terminates. The confirmation response is received by the MFP 10 in step S466 of FIG. 7. After the MFP 10 receives the confirmation response, the MFP 10 sends the service end command to the function server 30 in step S463. The reception of the service end command is confirmed by the function server 30 in step S712 (S712: YES).

Figure 17:
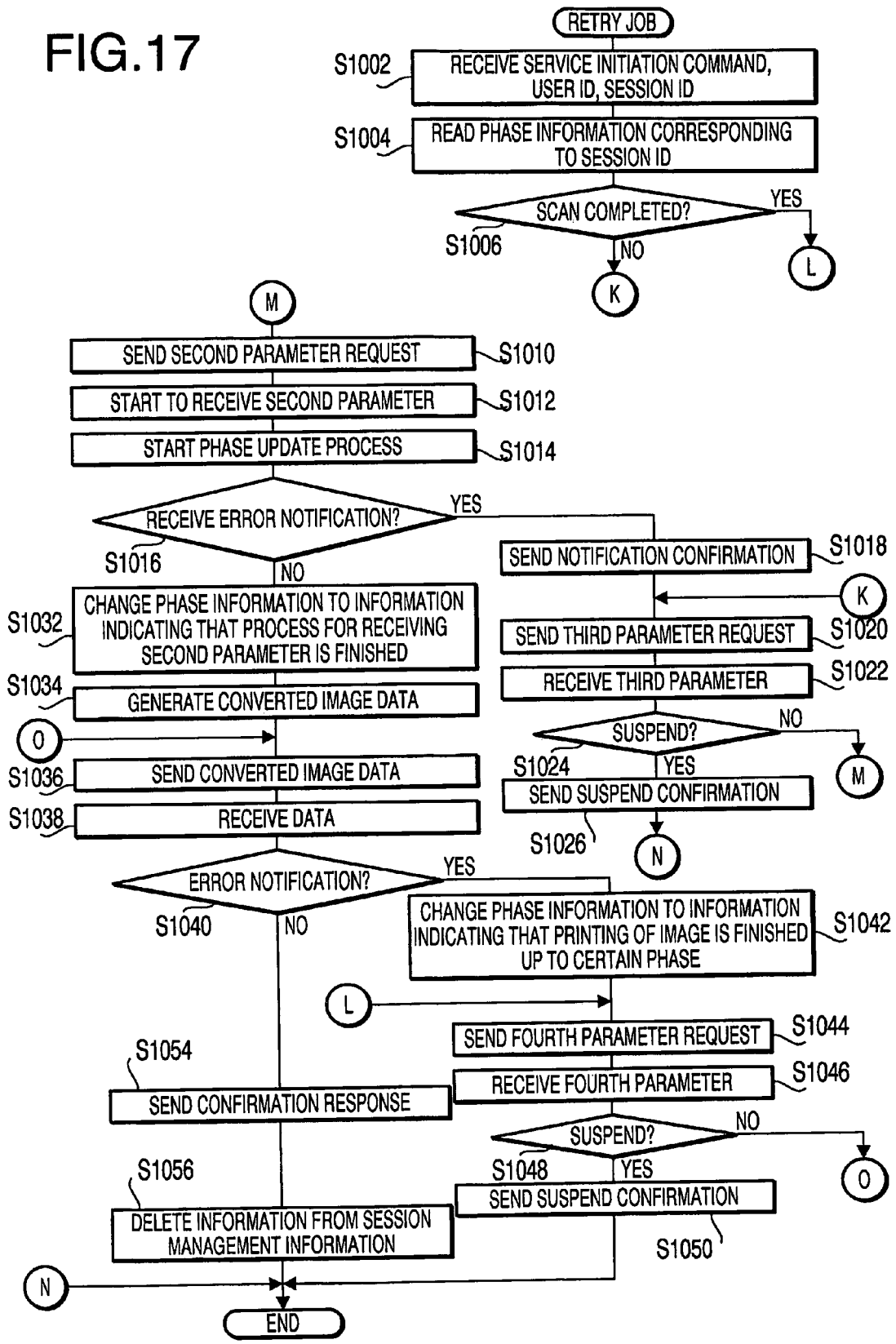
FIG. 17 is a flowchart illustrating a retry job executed by the function server.

Hereafter, a retry job executed under control of the control unit 31 of the function server 30 will be explained with reference to FIG. 17. The retry job is executed as one of the jobs to be initiated in step S804 of the server side session process.

First, the control unit 31 receives a user ID, a session ID and a service initiation command from the MFP 10 (S1002). Then, the control unit 31 reads out the phase information which is stored in the session management information while being associated with the received session ID (S1004).

Next, the control unit 31 checks whether the phase information (read out in step S1004) indicates that the process of the session is in the phase where the reception of the second parameter is finished. Specifically, if the phase information is "Translation Scan_Completed", the control unit 31 judges that the process of the session is in the phase where the reception of the second parameter is finished. If the process of the session is in the phase where the reception of the second parameter is finished (S1006: YES), the control unit 31 sends a fourth parameter request to the MFP 10 as an HTTP response as in the case of step S944 (S1044). If the phase information does not indicate that the process of the session is in the phase where the reception of the second parameter is finished (S1006: NO), the control unit 31 sends the third parameter request to the MFP 10 as an HTTP response as in the case of step S920.

The fourth parameter to be transmitted in step S1044 is formed so that information indicating that the printing is restarted from a midway point (i.e., a string indicating that the printing is executed from a certain page) is displayed on the MFP 10. The certain page means the page X+1 (where the page X corresponds to the phase information " . . . _Page X" which is stored in the session management information while being associated with the session ID received in step S1002).

The third parameter to be transmitted in step S1020 is formed so that information indicating that the input of the second parameter is executed from a midway point (i.e., a string indicating that the scanning is executed from a certain page) is displayed on the MFP 10 as a selectable item. The certain page means the page X+1 (where the page X corresponds to the phase information " . . . _Page X" which is stored in the session management information while being associated with the session ID received in step S1002). Since steps from S1010 to S1056 are the same as steps S910 to S956, explanations thereof will not be repeated.

Figure 10:
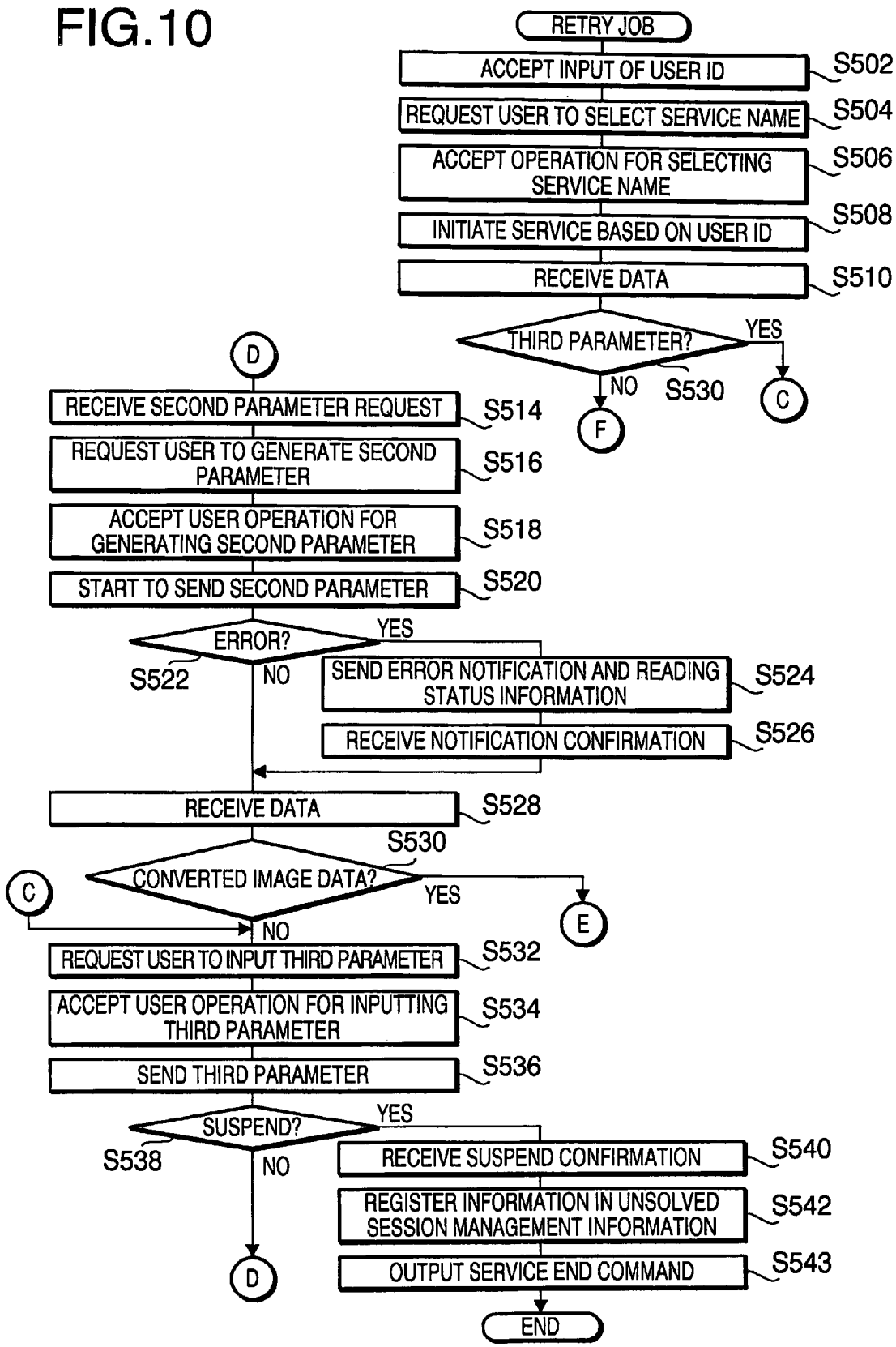
FIGS. 10 and 11 show a flowchart of a retry job executed by the MFP.
Figure 11:
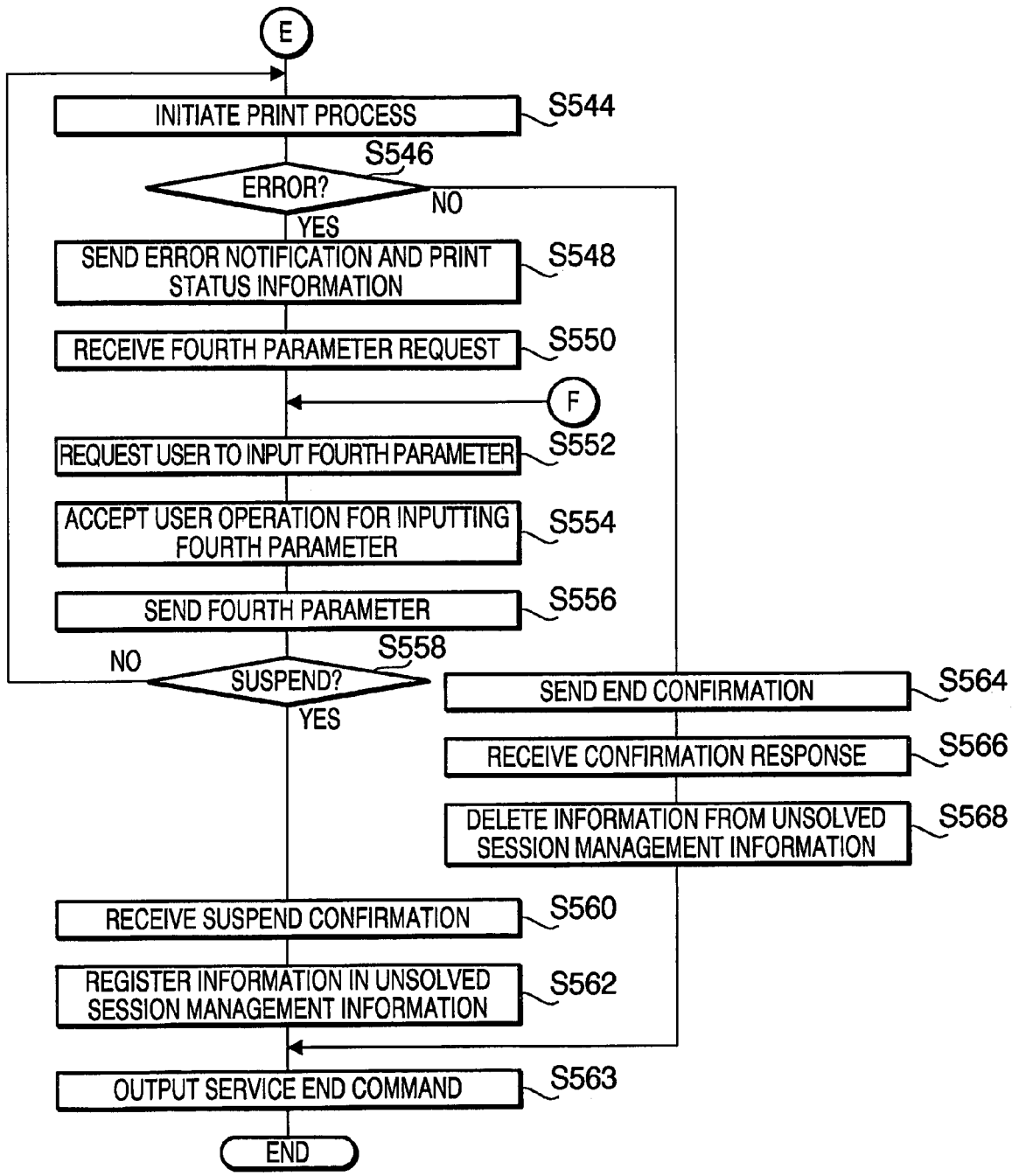

As described above, if an error arises in the providing of a service and execution of the service is interfered by the error (see S422 of FIG. 6, S446 of FIG. 7, S522 of FIG. 10 and S546 of FIG. 11), the MFP 10 notifies the function server 30 of the manner of restarting (see steps S424 to S436 of FIG. 6, steps S448 to S456 of FIG. 7, steps S524 to S536 of FIG. 10, steps S548 to S556 of FIG. 11) so that the MFP 10 can receives a command for restraint g the providing of the service (i.e., converted image data or confirmation response (S430 ("YES") of FIG. 6, S466 of FIG. 7, S530 ("YES") of FIG. 10, and S566 of FIG. 11). After receiving such a command from the function server 30, the MFP 10 is able to restart the process for receiving the service, thereby receiving the service from the function server 30 properly.

A user is able to select a manner of restarting to be notified to the function server 30 when an error arises, from more than one selectable items (manners of restarting) displayed on the parameter input screen (see FIGS. 8C and 8E, step S432 of FIG. 6, step S452 of FIG. 7, step S532 of FIG. 10, and step S552 of FIG. 11). That is, the user is able to designate a desirable manner of restarting. The selectable manners of restarting includes (A1) restarting from a phase at which an error arises, (A2) restarting the printing of images or the reading of images from the start, and (A3) restarting after suspending a process. Therefore, the user is able to continue receiving the service in a desirable manner of restarting that the user has designated through the parameter input screen.

It should be noted that the term "phase" corresponds to a process for exchanging each image data block between the MFP 10 and the function server 30 (i.e., the phase corresponds to a process for reading each image data block by the reading unit 13, a process for transmitting each data block, a process for receiving each image data block to be printed out by the recording unit 14, or a process for printing out each image data block by the recording unit 14). For example, if a user wants to restart the service from a pint at which an error arises, the user is able to select the manner of restarting (A1), so that user is able to receive the service continuously from the phase following the phase where the transmission of an image data block to the function server 30 is finished or the service continuously from the phase following the phase where the printing process for an image corresponding to an image data block is finished.

If a user wants to restart the service from the start, the user is able to select the manner of restarting (A2), so that the reading of images or the printing of images is started from the start. In this case, the user is able to receive the service continuously. If a user wants to suspend the providing of the service and to restart the service at a desired time, the user is able to select the manner of restarting (A3), so that the user is able to continuously receive the service at a convenient time for the user.

As described above, the user is able to designate a desirable manner of restarting. In other words, the user is able to determine a manner of offering of a service in the case where the service is suspended by an error. It should be understood that the system 100 enables a user to decide a conclusive manner of offering of a service when the service is suspended by an error.

In the above mentioned embodiment, if an error arises in the MFP 10 (see step S422 of FIG. 6, S522 of FIG. 10), the error notification and the reading status information are sent to the function server 30 (see S424 of FIG. 6 and S524 of FIG. 10). Therefore, the function server 30 is able to generate the third parameter request based on the reading status information (see S920 of FIG. 15). Similarly, the error notification and the printing status information are sent to the function server 30 (see S448 of FIG. 7 and S558 of FIG. 11). Therefore, the function server 30 is able to generate the fourth parameter request based on the printing status information (see S944 of FIG. 15).

Figure 15:
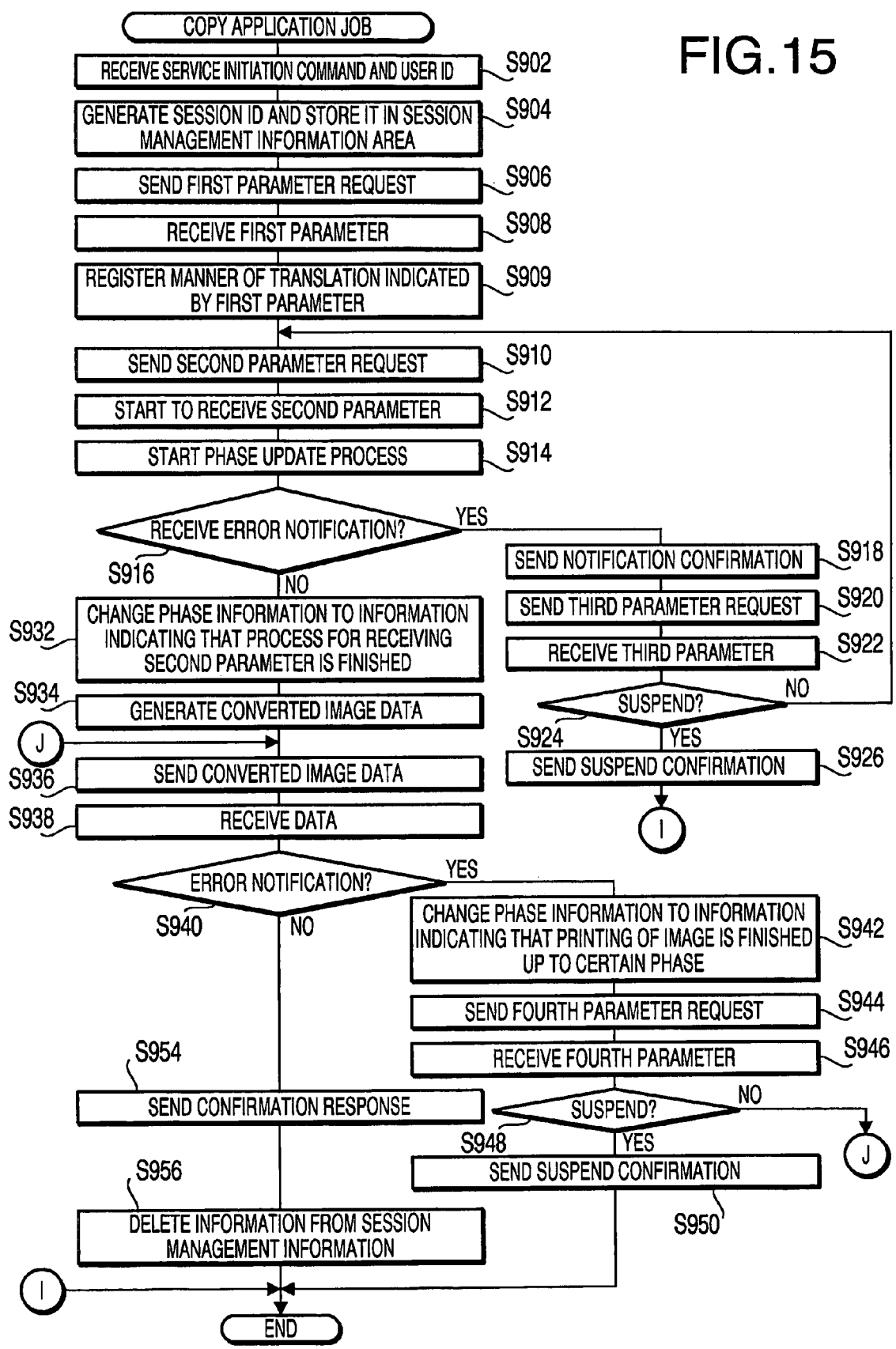
FIG. 15 is a flowchart illustrating a copy application job executed by the function server.

If the third or fourth parameter inputted by the user through the MFP 10 is intended for the suspend (see S438 ("YES") of FIG. 6, S458 ("YES") of FIG. 7, and S924 and S948 ("YES") of FIG. 15), the copy application job is suspended (see steps from S440 of FIG. 6, steps from S460 of FIG. 7, S926 and steps from S950 of FIG. 15). Subsequently, the user is able to initiate a retry job at a desirable time, so that the service is restarted based on the unsolved session management information stored in the MFP 10 and the session management information stored in the function server 30 (FIGS. 10, 11 and 17).

Therefore, if the user wants to suspend the restart of the providing of the service, the only thing that the user is required is not to conduct a user operation for initiating the retry job. In other words, the user is able to restart the providing of the service at a desired time.

Figure 5:
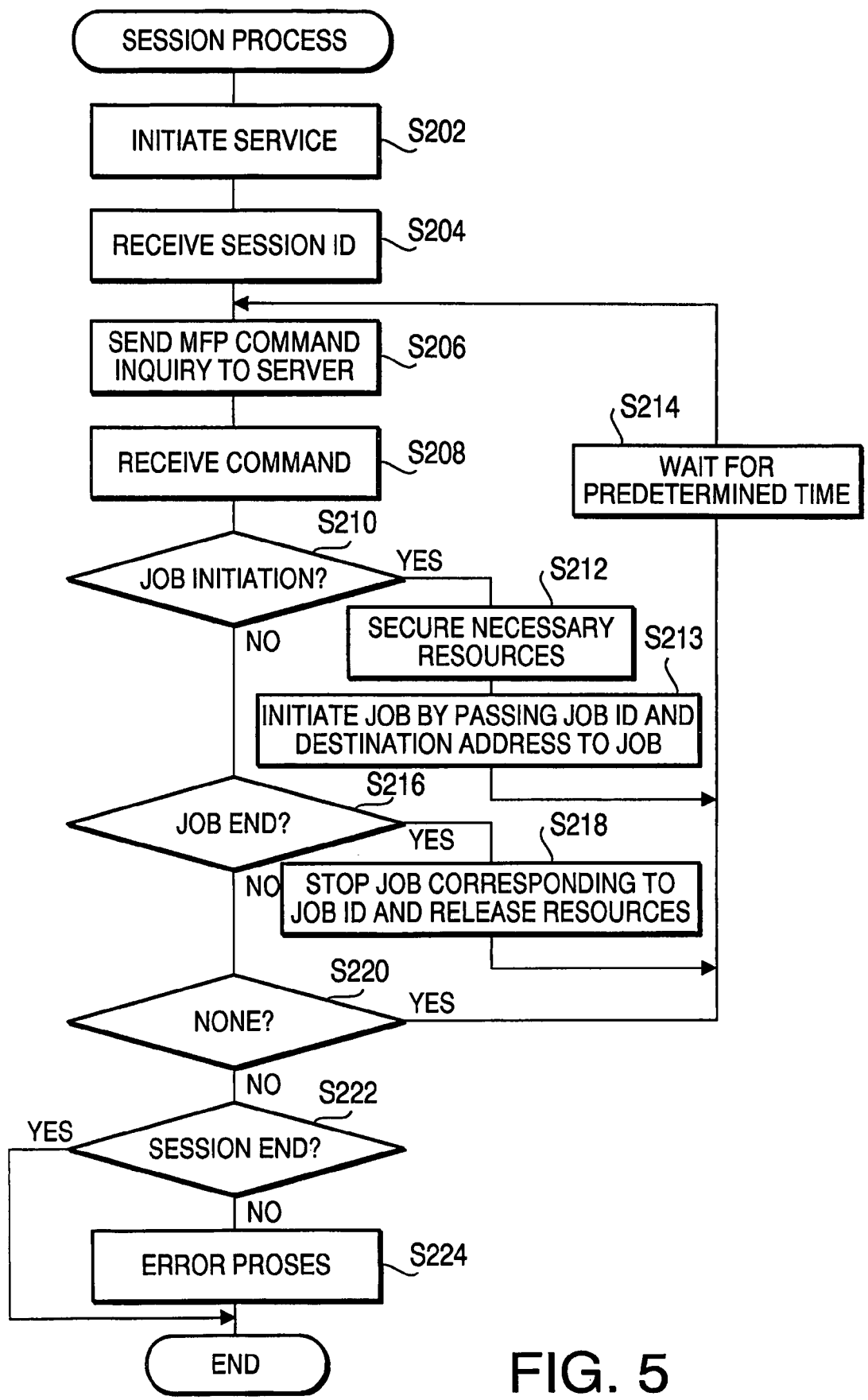
FIG. 5 is a flowchart illustrating a session process executed by the MFP.

If the parameter intended for the suspend is inputted by the user, resources secured in the MFP 10 and the function server 30 are released at the time when the copy application job is terminated (see S218 of FIG. 5 and S714 of FIG. 13). Therefore, the resources of the MFP 10 and the function server 30 are prevented from being used wastefully during the suspend state of the service, and can be used for other processes.

Although the present invention has been described in considerable detail with reference to certain preferred embodiments thereof, other embodiments are possible.

For example, the MFP 10 functioning as a client device for receiving services from the function server 30 may be replaced with another device such as a printer or a scanner having the above mentioned functions of reading images and transmitting image data of the read images (image data blocks) to the function server 30, and printing out image data transmitted from the function server 30, although in the above mentioned embodiment only the MFP 10 is provided for the service providing system 100 as a client device.

In the above mentioned embodiment, only one server (the function server 30) is provided for the system 100. However, more than one servers (each having the function as the function server 30) may be provided for the service providing system 100.

In the above mentioned embodiment, the third parameter request is formed in step S920 so that a string indicating that the scanning is to be executed from a certain page is generated based on the reading end information received in step S916. However, the third parameter may be generated so that a string indicating that the scanning is to be executed for pages from the page X obtained from the string " . . . _Page X" contained in the phase information.

What is claimed is:

1. A service providing system, comprising:
a client device comprising at least one of an image reading unit which reads an image and generates image data representing the image and an image printing unit which prints an image represented by the image data; and
a server configured to execute a service regarding at least one of functions of the image reading unit and the image printing unit,
wherein the client device comprises:
a function execution unit that controls one of the image reading unit and the image printing unit to execute one of the functions of the image reading unit and the image printing unit in accordance with an execution command requesting execution of a function received from the server;
an error notification unit that notifies the server of occurrence of an error and identification information for identifying a phase in which the error arises if an error interfering with execution of a function controlled by the function execution unit arises before the execution of the function is finished;
a manner designation unit that requests designation of a manner of restarting indicating how to restart execution of a function, which is interfered by the error and is to be controlled by the function execution unit, if a command requesting designation of the manner of restarting is received from the server which has notified of the occurrence of an error;
a manner notification unit that sends a notification containing the designated manner of restarting to the server; and
a restart request unit that transmits a request for a restart of the execution of the function interfered by the error to the server, after the occurrence of the error is notified to the server,
wherein the function execution unit restarts the execution of the function interfered by the error in accordance with a command requesting a restart of the function received from the server which has been notified of the designated manner of restarting, and
wherein the manner designation unit requests the designation of the manner of restarting, according to a command from the server which has received the request from the restart request unit, wherein the server comprises:
a service providing unit that sends the execution command as one of operations for providing a service for the client device;
a phase identifying unit that identifies a phase in which the error interfering with the execution of the function arises, from among phases existing throughout the execution of the function, based on the identification information contained in a notification received from the error notification unit during the execution of the function;
a phase registration unit that registers the identified phase in association with the client device; and
a designation instruction unit that transmits, to the client device, the command requesting the designation of the manner of restarting so that the manner of restarting is designated from among more than one manner of restarting comprising a manner for restarting the execution of the function from the phase identified by the phase identifying unit,
wherein the service providing unit operates to send the command requesting restart to the client device to restart the execution of the service according to the designated manner of restarting notified by the client device when the server is notified of the designated manner of restarting from the client device that has received the command from the designation instruction unit, and
wherein, when the server receives the request for the restart of the execution of the function from the client device, the designation instruction unit of the server specifies the identified phase corresponding to the client device from among phases registered by the phase registration unit, and transmits the command requesting the designation of the manner of restarting so that the manner of restarting is designated from among the more than one manner of restarting comprising the manner for restarting the execution of the function from the identified phase corresponding to the client device.

2. The service providing system according to claim 1, wherein:
the function execution unit of the client device is configured to cause the image reading unit to generate image data to be obtained by reading images formed on a recording medium set at a predetermined reading position and to transmit the image data to the server, when the client device receives a request for the image data to be obtained by reading images formed on the recording medium as the execution command;
the error notification unit of the client device is configured to notify the server of the occurrence of an error if one of a reading error and a transmission error arises before transmission of the image data by the function execution unit is finished;
the service providing unit of the server executes a command process for sending the request for the image data to be obtained by reading images formed on the recording medium to the client device, and for receiving the image data from the client device which has received the request;
the phase identifying unit of the server identifies a phase following a phase in which images represented by the received image data have been successfully read, using the image data successfully received from the client device which has received the request of the command process, as the phase in which the error interfering with the execution of the function arises, if the command process is not finished at a time when the occurrence of the error is notified; and
if the designated manner of restarting notified from the client device which has received the command from the designation instruction unit indicates that the execution of the function is to be restarted from the identified phase and if the identified phase is preceding completion of reception of all of the image data requested from the client device in the command process, the service providing unit executes a restart command process for sending an instruction requesting the client device to restart the reading of images from the identified phase and for receiving image data from the client device which has received the instruction.

3. The service providing system according to claim 2, wherein the error notification unit of the client device sends reading status information enabling the server to identify image data for which the reading of images has been successfully finished before a time when the notification of the error is received, if one of the reading error and the transmission error arises before transmission of the image data by the function execution unit is finished.

4. The service providing system according to claim 1, wherein:
the function execution unit of the client device is configured to cause the image printing unit to print one or more images represented by image data from the server on recording medium, if the client device receives the image data and a request for printing images represented by the image data on recording medium from the server as the execution command;
the error notification unit of the client device is configured to notify the server of the occurrence of an error, together with print status information enabling the server to identify a image for which the printing of images has been successfully finished before a time when the error arises, if one of a reception error of the image data and a print error of the images arises before printing for all of the image data by the function execution unit is finished;
the service providing unit of the server executes a command process for sending the image data to the client device, and for sending the request for printing one or more images represented by the image data on recording medium to the client device;
the phase identifying unit of the server identifies a phase following a phase in which the printing of the image identified from the print status information is finished, as the phase to be identified, if the occurrence of the error is notified from the client device together with the print status information; and
if the designated manner of restarting notified from the client device which has received the command from the designation instruction unit indicates that the execution of the function is to be restarted from the identified phase and if the identified phase is preceding completion of the printing of all of the images represented by the image data requested from the client device in the command process, the service providing unit requests transmission of at least a part of image data blocks required for restarting the printing of the images from the identified phase and the printing of one or more images represented by the part of the image data blocks, from the client device.

5. A client device comprising at least one of an image reading unit which reads an image and generates image data representing the image and an image printing unit which prints an image represented by image data, the client device being connected to a server for receiving services concerning at least one of functions of the image reading unit and the image printing unit from the server, comprising:

a function execution unit that controls one of the image reading unit and the image printing unit to execute one of the functions of the image reading unit and the image printing unit in accordance with an execution command requesting execution of a function received from the server;

an error notification unit that notifies the server of occurrence of an error and identification information for identifying a phase in which the error arises if an error interfering with execution of a function controlled by the function execution unit arises before the execution of the function is finished, such that the identified phase is registered in the server in association with the client device;

a manner designation unit that requests designation of a manner of restarting indicating how to restart execution of a function, which is interfered by the error and is to be controlled by the function execution unit, if a command requesting designation of the manner of restarting is received from the server which has notified of the occurrence of an error;

a manner notification unit that sends a notification containing the designated manner of restarting to the server; and a restart request unit that transmits a request for a restart of the execution of the function interfered by the error to the server after the occurrence of the error is notified to the server, such that, when the request to restart the execution of the function is received by the server, the server specifies the identified phase corresponding to the client device from among phases registered therein and transmits a command requesting the designation of the manner of restarting, wherein the function execution unit restarts the execution of the function interfered by the error in accordance with a command requesting a restart of the function received from the server which has been notified of the designated manner of restarting, wherein the manner designation unit requests the designation of the manner of restarting, according to a command from the server which has received the request from the restart request unit, and wherein the manner of restarting is designated from among more than one manner of restarting comprising a manner of restarting the execution of the function from the identified phase corresponding to the client device after receiving the command requesting the designation of the manner of restarting from the server.

6. A server for providing a service for a client device comprising at least one of an image reading unit which reads an image and generates image data representing the image and an image printing unit which prints an image represented by the image data, the service concerning one of functions of the image reading unit and the image printing unit, comprising:

a service providing unit that sends an execution command as one of operations for providing a service for the client device;

a phase identifying unit that identifies a phase in which an error interfering with the execution of a function arises, from among phases existing throughout the execution of the function, based on identification information contained in a notification received in the server from an error notification unit that notifies the server of occurrence of the error and the identification information for identifying the phase in which the error arises if the error arises before the execution of the function is finished;

a phase registration unit that registers the identified phase in association with the client device; and a designation instruction unit that transmits, to the client device, the command requesting the designation of a manner of restarting so that the manner of restarting is designated from among more than one manner of restarting comprising a manner for restarting the execution of the function from the phase identified by the phase identifying unit, wherein the service providing unit operates to send the command requesting restart to the client device to restart the execution of the service according to the manner of restarting notified by the client device when the server is notified of the manner of restarting from the client device that has received the command from the designation instruction unit, and wherein, when the server receives a request for a restart of the execution of the function from the client device, the designation instruction unit of the server specifies the identified phase corresponding to the client device from among phases registered by the phase registration unit, and transmits the command requesting the designation of the manner of restarting so that the manner of restarting is designated from among the more than one manner of restarting comprising the manner for restarting the execution of the function from the identified phase corresponding to the client device.

7. A method for receiving services from a server, the method being implemented on a client device having an image reading unit which reads an image and generates image data representing the image and an image printing unit which prints an image represented by image data, the method comprising the steps of:

executing one of functions of the image reading unit and the image printing unit in accordance with an execution command requesting execution of a function received from the server;

notifying the server of occurrence of an error and identification information for identifying a phase in which the error arises if an error interfering with execution of a function executed by the executing step arises before execution of the function is finished, such that the identified phase is registered in the server in association with the client device;

requesting designation of a manner of restarting indicating how to restart execution of the function, which is interfered by the error, if a command requesting designation of a manner of restarting is received from the server which has notified of the occurrence of the error; and sending a notification containing the designated manner of restarting to the server; and transmitting a request for a restart of the execution of the function interfered by the error to the server after the occurrence of the error is notified to the server, such that, when the server receives the request to restart the execution of the function, the server specifies the identified phase corresponding to the client device from among phases registered therein and transmits a command requesting the designation of the manner of restarting, wherein in the executing step, the execution of the function interfered by the error is restarted in accordance with a command requesting a restart of the function received from the server which has been notified of the designated manner of restarting, wherein requesting the designation of the manner of restarting comprises requesting the designation of the manner of restarting according to a command from the server which has received the request to restart the execution of the function, and wherein the manner of restarting is designated from among a plurality of manners of restarting comprising a manner of restarting the execution of the function from the identified phase corresponding to the client device after receiving the command requesting the designation of the manner of restarting from the server.

8. A method for providing services, the method being implemented on a server to provide services for a client device having an image reading unit which reads an image and generates image data representing the image and an image printing unit which prints an image represented by image data, the method comprising the steps of:

sending an execution command as one of operations for providing a service for the client device;

identifying a phase in which an error interfering with execution of a function executed by the client device arises, from among phases existing throughout the execution of the function, based on identification information contained in a notification received in the server from an error notification unit in the client device that notifies the server of occurrence of the error and the identification information for identifying the phase in which the error arises if the error arises before the execution of the function is finished;

registering the identified phase in association with the client device; and when a request for a restart of the execution of the function is received from the client device:

specifying the identified phase corresponding to the client device from among registered phases, and transmitting a command, to the client device, requesting a designation of a manner of restarting so that the manner of restarting is designated from among more than one manners of restarting comprising a manner for restarting the execution of the function from the phase identified by the identifying step, wherein in the sending step, a command requesting restart is sent to the client device to restart the execution of the service according to the manner of restarting notified by the client device when the server is notified of the manner of restarting from the client device that has received the command requesting the designation of a manner restarting, and wherein the step of transmitting the command requesting the designation of the manner of restarting comprises designating the manner of restarting from among the more than one manner of restarting comprising the manner for restarting the execution of the function from the identified phase corresponding to the client device.

9. A non-transitory, computer-readable medium having a program stored thereon for use on a client device having an image reading unit which reads an image and generates image data representing the image and an image printing unit which prints an image represented by image data, the computer program comprising computer readable instructions that cause the client device to carry out a method for receiving services from a server, the method comprising the steps of:

executing one of functions of the image reading unit and the image printing unit in accordance with an execution command requesting execution of a function received from the server;

notifying the server of occurrence of an error and identification information for identifying a phase in which the error arises if an error interfering with execution of a function executed by the executing step arises before execution of the function is finished, such that the identified phase is registered in the server in association with the client device;

requesting designation of a manner of restarting indicating how to restart execution of the function, which is interfered by the error, if a command requesting designation of a manner of restarting is received from the server which has notified of the occurrence of the error;

sending a notification containing the designated manner of restarting to the server; and transmitting a request for a restart of the execution of the function interfered by the error from the server after the occurrence of the error is notified to the server, such that, when the server receives the request to restart the execution of the function, the server specifies the identified phase corresponding to the client device from among phases registered therein and transmits a command requesting the designation of the manner of restarting, wherein in the executing step, the execution of the function interfered by the error is restarted in accordance with a command requesting a restart of the function received from the server which has been notified of the designated manner of restarting, wherein requesting the designation of the manner of restarting comprises requesting the designation of the manner of restarting according to a command from the server which has received the request to restart the execution of the function, and wherein the manner of restarting is designated from among a plurality of manners of restarting comprising a manner of restarting the execution of the function from the identified phase corresponding to the client device after receiving the command requesting the designation of the manner of restarting from the server.

10. A non-transitory, computer-readable medium having a program stored thereon for use on a server, the computer program comprising computer readable instructions that cause the server to carry out a method for providing services for a client device having an image reading unit which reads an image and generates image data representing the image and an image printing unit which prints an image represented by image data, the method comprising the steps of:

sending an execution command as one of operations for providing a service for the client device;

identifying a phase in which an error interfering with execution of a function executed by the client device arises, from among phases existing throughout the execution of the function, based on identification information contained in a notification received in the server from an error notification unit in the client device that notifies the server of occurrence of the error and the identification information for identifying the phase in which the error arises if the error arises before the execution of the function is finished;

registering the identified phase in association with the client device; and when a request for a restart of the execution of the function is received from the client device:

specifying the identified phase corresponding to the client device from among registered phases, and transmitting a command, to the client device, requesting a designation of a manner of restarting so that the manner of restarting is designated from among more than one manner of restarting comprising a manner for restarting the execution of the function from the phase identified by the identifying step, wherein in the sending step, a command requesting restart is sent to the client device to restart the execution of the service according to the manner of restarting notified by the client device when the server is notified of the manner of restarting from the client device that has received the command requesting the designation of a manner restarting, and wherein the step of transmitting the command requesting the designation of the manner of restarting comprises designating the manner of restarting from among the more than one manner of restarting comprising the manner for restarting the execution of the function from the identified phase corresponding to the client device.

* * * * *